United States Patent
Matsutani et al.

(10) Patent No.: US 12,545,790 B2
(45) Date of Patent: Feb. 10, 2026

(54) ANTIFOGGANT COMPOSITION AND ANTI-FOG ARTICLE HAVING ANTIFOGGING FILM FORMED FROM SAID COMPOSITION

(71) Applicant: NOF CORPORATION, Tokyo (JP)

(72) Inventors: Hiroki Matsutani, Chita-gun (JP); Takamitsu Kano, Chita-gun (JP)

(73) Assignee: NOF CORPORATION, Tokyo (JP)

( * ) Notice: Subject to any disclaimer, the term of this patent is extended or adjusted under 35 U.S.C. 154(b) by 786 days.

(21) Appl. No.: 17/910,233

(22) PCT Filed: Mar. 5, 2021

(86) PCT No.: PCT/JP2021/008705
§ 371 (c)(1),
(2) Date: Mar. 6, 2023

(87) PCT Pub. No.: WO2021/182331
PCT Pub. Date: Sep. 16, 2021

(65) Prior Publication Data
US 2023/0193044 A1    Jun. 22, 2023

(30) Foreign Application Priority Data

Mar. 10, 2020   (JP) ................. 2020-040438

(51) Int. Cl.
| | | |
|---|---|---|
| C09D 5/00 | (2006.01) | |
| C09D 7/20 | (2018.01) | |
| C09D 7/45 | (2018.01) | |
| C09D 7/61 | (2018.01) | |
| C09D 133/26 | (2006.01) | |
| C09D 175/14 | (2006.01) | |

(52) U.S. Cl.
CPC ................ C09D 5/00 (2013.01); C09D 7/20 (2018.01); C09D 7/45 (2018.01); C09D 7/61 (2018.01); C09D 133/26 (2013.01); C09D 175/14 (2013.01)

(58) Field of Classification Search
None
See application file for complete search history.

(56) References Cited

U.S. PATENT DOCUMENTS

| | | |
|---|---|---|
| 2010/0243221 A1 | 9/2010 | Yamasaki et al. |
| 2012/0245250 A1 | 9/2012 | Kano et al. |

FOREIGN PATENT DOCUMENTS

| | | |
|---|---|---|
| EP | 3 199 607 A1 | 8/2017 |
| JP | 59-015473 A | 1/1984 |
| JP | 2008-308661 A | 12/2008 |
| JP | 2011-140589 A | 7/2011 |
| JP | 2016-027134 A | 2/2016 |
| JP | 2019-006881 A | 1/2019 |
| WO | 2009/044912 A1 | 4/2009 |

OTHER PUBLICATIONS

International Search Report for PCT/JP2021/008705 dated May 18, 2021.
Extended European Search Report dated May 2, 2024 issued by European Patent Office in European Application No. 21 76 7503.
International Preliminary Report on Patentability with the translation of Written Opinion dated Sep. 6, 2022 from the International Bureau in International Application No. PCT/JP2021/008705.

*Primary Examiner* — Jeffrey D Washville
(74) *Attorney, Agent, or Firm* — Sughrue Mion, PLLC

(57) ABSTRACT

An antifoggant composition including a copolymer (A), a blocked polyisocyanate hardener (B), colloidal silica (C), a surfactant (D), and water (E), wherein the copolymer (A) is a (meth)acrylate copolymer obtained from a monomer mixture comprising monomer (a-1) represented by general formula (1), monomer (a-2) represented by general formula (2), and monomer (a-3) represented by general formula (3) and the amounts of the blocked polyisocyanate hardener (B), colloidal silica (C), and water (E) are 35-300 parts by mass, 80-600 parts by mass, and 650 parts by mass or more, respectively, per 100 parts by mass of the copolymer (A).

9 Claims, No Drawings

ANTIFOGGANT COMPOSITION AND ANTI-FOG ARTICLE HAVING ANTIFOGGING FILM FORMED FROM SAID COMPOSITION

CROSS REFERENCE TO RELATED APPLICATIONS

This application is a National Stage of International Application No. PCT/JP2021/008705 filed Mar. 5, 2021, claiming priority based on Japanese Patent Application No. 2020-040438 filed Mar. 10, 2020.

TECHNICAL FIELD

The present invention relates to an antifoggant composition and an anti-fog article comprising an antifogging film formed from the composition.

BACKGROUND ART

When a highly-humid air enters a light chamber in a vehicle lighting device such as an automobile headlamp and a lens is cooled by outside air or rainfall, fogging may occur due to condensation of moisture on the inner surface thereof. As a result, the luminance of the vehicle lamp decreases and the aesthetic appearance of the lens surface is impaired, which may cause discomfort of users. A method of applying an antifoggant to a part where fogging occurs to prevent such fogging of the lens is known (Patent Documents 1 to 5).

Patent Document 2 describes that in the antifoggant composition described in Patent Document 1, the solvent used has a high base material erosion property, thus polycarbonate and polymethyl methacrylate as base materials are deteriorated, and solvent cracking (phenomenon in which a solvent erodes a base material and cracks are generated on the base material during coating and drying of coating liquid) occurs. Further, Patent Document 2 discloses to provide an antifogging composition containing a specific alcohol solvent and a specific glycol ether solvent as main solvents for the purpose of suppressing such solvent cracking.

PRIOR ART DOCUMENTS

Patent Documents

Patent Document 1: JP-A-2011-140589
Patent Document 2: JP-A-2016-27134
Patent Document 3: JP-A-2019-6881
Patent Document 4: WO2009/044912
Patent Document 5: JP-A-2008-308661

SUMMARY OF THE INVENTION

Problems to be Solved by the Invention

However, it has been found that in the antifoggant composition disclosed in Patent Document 2, solvent cracking in base materials having a relatively high internal stress such as a large injection-molded article and an injection-molded article having a complicated shape is insufficiently suppressed. The antifoggant composition disclosed in Patent Document 3 contains a large amount of an organic solvent, and thus suppression of solvent cracking may be also insufficient.

Meanwhile, as disclosed in Patent Document 3, an antifogging film formed from an antifoggant composition is required to have antifogging properties, adhesion to a base material, and water resistance. The antifoggants disclosed in Patent Documents 4 and 5 have a problem of insufficient transparency due to insufficient compatibility between a metal oxide such as a colloidal silica and a copolymer such as an acrylate.

The present invention has been made in view of the above circumstances, and an object of the present invention is to provide an antifoggant composition excellent in suppression of solvent cracking when the antifoggant composition is applied, dried, and heat-cured and capable of forming an antifogging film that is excellent in antifogging properties, adhesion, water resistance, and transparency.

Means for Solving the Problems

That is, the present invention relates to an antifoggant composition, comprising: a copolymer (A); a blocked polyisocyanate curing agent (B); a colloidal silica (C); a surfactant (D); and water (E), wherein the copolymer (A) is a (meth)acrylate copolymer obtained from a monomer mixture containing an N,N-dialkyl (meth)acrylamide monomer (a-1) represented by General Formula (1):

[Formula 1]

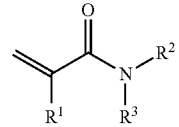

... (1)

(wherein $R^2$ is a hydrogen atom or a methyl group, and $R^2$ and $R^3$ are independently a linear or branched alkyl group having 1 to 8 carbon atoms); an ε-caprolactone-added hydroxyalkyl (meth)acrylate monomer (a-2) represented by General Formula (2):

[Formula 2]

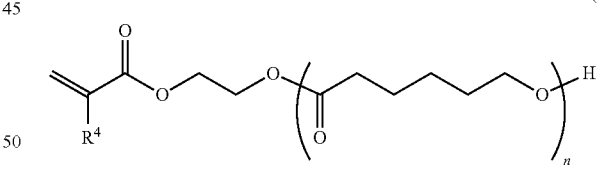

(2)

(wherein $R^4$ is a hydrogen atom or a methyl group, and n is an integer of 1 to 10.); and a (meth)acrylate monomer (a-3) having a hydrocarbon group represented by General Formula (3):

[Formula 3]

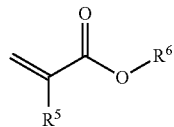

(3)

(wherein $R^5$ is a hydrogen atom or a methyl group, and $R^6$ is a linear, branched, or cyclic hydrocarbon group having 1 to 22 carbon atoms.), and an amount of the blocked polyisocyanate curing agent (B) is 35 to 300 parts by mass, an amount of the colloidal silica (C) is 80 parts by mass or more and 600 parts by mass or less, and an amount of the water (E) is 650 parts by mass or more relative to 100 parts by mass of the copolymer (A).

The present invention also relates to an anti-fog article, comprising an antifogging film formed from the antifoggant composition on a base material.

Effect of the Invention

The details of action mechanism of the effect of the antifoggant composition, the antifogging film, and the anti-fog article of the present invention are not completely known, but are estimated as follows. It is to be noted that the present invention should not be interpreted based on only this action mechanism.

The antifoggant composition of the present invention comprises: a copolymer (A); a blocked polyisocyanate curing agent (B); a colloidal silica (C); a surfactant (D); and water (E). Because the copolymer (A) contains the monomers (a-1) to (a-3), the antifogging properties of the antifogging film are mainly increased based on the monomer (a-1), the compatibility between the copolymer (A) and the colloidal silica (C) is increased, so that the transparency of the antifogging film is increased, and a crosslinked structure can be formed with the blocked polyisocyanate curing agent (B), so that the water resistance of the antifogging film is increased based on the monomer (a-2), and the water resistance of the antifogging film is increased based on the monomer (a-3). Thus, an antifoggant composition capable of forming an antifogging film excellent in antifogging properties, adhesion, water resistance, and transparency can be obtained. Because the antifoggant composition of the present invention comprises a specific amount of the colloidal silica (C), the water resistance of the antifogging film can be further increased. Furthermore, because the antifoggant composition of the present invention comprises a specific amount of the water (E), the content of organic solvents is reduced, so that solvent cracking in the base material can be suppressed.

MODE FOR CARRYING OUT THE INVENTION

The antifoggant composition of the present invention comprises: a copolymer (A); a blocked polyisocyanate curing agent (B); a colloidal silica (C); a surfactant (D); and water (E).

<Copolymer (A)>

The copolymer (A) of the present invention is a (meth)acrylate copolymer obtained from a monomer mixture, and the monomer mixture contains at least the following monomers (a-1) to (a-3).

<Monomer (a-1)>

The monomer (a-1) of the present invention is an N,N-dialkyl (meth)acrylamide monomer (a-1) represented by General Formula (1):

[Formula 4]

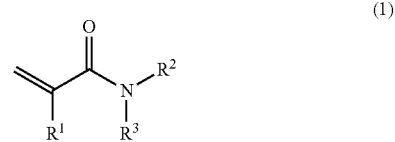

(1)

(wherein $R^1$ is a hydrogen atom or a methyl group, and $R^2$ and $R^3$ are independently a linear or branched alkyl group having 1 to 8 carbon atoms.).

Examples of the linear or branched alkyl group having 1 to 8 carbon atoms in the General Formula (1) include a methyl group, an ethyl group, an n-propyl group, an i-propyl group, an n-butyl group, an i-butyl group, a t-butyl group, an n-amyl group, an i-amyl group, a t-amyl group, an n-hexyl group, an n-octyl group, and a 2-ethylhexyl group. From the viewpoint that the antifogging performance of the antifogging film can be increased, the alkyl group is preferably a linear or branched alkyl group having 1 to 4 carbon atoms, more preferably a methyl group or an ethyl group, and still more preferably a methyl group. The monomer (a-1) may be used singly or in combination of two or more types thereof.

<Monomer (a-2)>

The monomer (a-2) of the present invention is a ε-caprolactone-added hydroxyalkyl (meth)acrylate monomer (a-2) represented by General Formula (2):

[Formula 5]

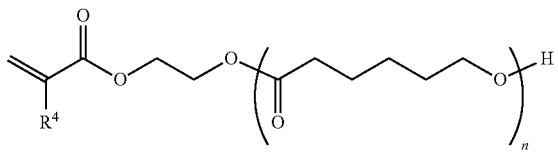

(2)

(wherein $R^4$ is a hydrogen atom or a methyl group, and n is an integer of 1 to 10.).

In the General Formula (2), n is preferably an integer of 1 to 5 from the viewpoint that the transparency of the antifogging film can be increased. The monomer (a-2) may be used singly or in combination of two or more types thereof.

The monomer (a-3) of the present invention is a (meth)acrylate monomer (a-3) having a hydrocarbon group represented by General Formula (3):

[Formula 6]

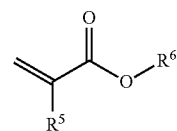

(3)

(wherein $R^5$ is a hydrogen atom or a methyl group, and $R^6$ is a linear, branched, or cyclic hydrocarbon group having 1 to 22 carbon atoms.).

Examples of the linear, branched, or cyclic hydrocarbon group having 1 to 22 carbon atoms in the General Formula (3) include alkyl groups such as a methyl group, an ethyl group, an n-propyl group, an i-propyl group, an n-butyl group, an i-butyl group, a t-butyl group, an n-amyl group, an i-amyl group, a t-amyl group, an n-hexyl group, a cyclohexyl group, an n-octyl group, a 2-ethylhexyl group, an n-nonyl group, an isobornyl group, a lauryl group, a myristyl group, a cetyl group, a stearyl group, and a behenyl group; alkenyl groups such as an oleyl group; and aryl groups such as a phenyl group. The hydrocarbon group is preferably a linear, branched, or cyclic hydrocarbon group having 2 to 18 carbon atoms, and more preferably a linear, branched, or cyclic hydrocarbon group having 4 to 16 carbon atoms from the viewpoint that the water resistance of the antifogging film can be increased. The monomer (a-3) may be used singly or in combination of two or more types thereof.

The amount of the monomer (a-1) is preferably 20 to 90 parts by mass in 100 parts by mass of the total of the monomer (a-1), the monomer (a-2), and the monomer (a-3). The amount of the monomer (a-1) is more preferably 30 parts by mass or more, still more preferably 40 parts by mass or more, and still more preferably 50 parts by mass or more in 100 parts by mass of the total of the monomer (a-1), the monomer (a-2), and the monomer (a-3) from the viewpoint of improving the antifogging properties of the antifogging film, and is more preferably 80 parts by mass or less, and still more preferably 70 parts by mass or less in 100 parts by mass of the total of the monomer (a-1), the monomer (a-2), and the monomer (a-3) from the viewpoint of improving the water resistance of the antifogging film.

The amount of the monomer (a-2) is preferably 5 to 50 parts by mass in 100 parts by mass of the total of the monomer (a-1), the monomer (a-2), and the monomer (a-3). The amount of the monomer (a-2) is more preferably 10 parts by mass or more, still more preferably 15 parts by mass or more in 100 parts by mass of the total of the monomer (a-1), the monomer (a-2), and the monomer (a-3) from the viewpoint of improving the transparency of the antifogging film, and is more preferably 40 parts by mass or less, still more preferably 35 parts by mass or less in 100 parts by mass of the total of the monomer (a-1), the monomer (a-2), and the monomer (a-3) from the viewpoint of improving the antifogging properties of the antifogging film.

The amount of the monomer (a-3) is preferably 1 to 40 parts by mass in 100 parts by mass of the total of the monomer (a-1), the monomer (a-2), and the monomer (a-3). The amount of the monomer (a-3) is more preferably 3 parts by mass or more, still more preferably 5 parts by mass or more in 100 parts by mass of the total of the monomer (a-1), the monomer (a-2), and the monomer (a-3) from the viewpoint of improving the water resistance of the antifogging film, and is more preferably 35 parts by mass or less, still more preferably 30 parts by mass or less in 100 parts by mass of the total of the monomer (a-1), the monomer (a-2), and the monomer (a-3) from the viewpoint of improving the antifogging properties of the antifogging film.

The total proportion of the monomer (a-1), the monomer (a-2), and the monomer (a-3) in the monomer mixture is preferably 70 mass % or more, more preferably 80 mass % or more, and still more preferably 90 mass % or more.

The monomer mixture may contain the following monomer (a-4) and/or monomer (a-5) from the viewpoint of improving the water resistance of the antifogging film.

The monomer (a-4) of the present invention is a (meth)acrylate monomer (a-4) having a hydroxyl group represented by General Formula (4):

[Formula 7]

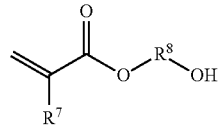

(4)

(wherein $R^7$ is a hydrogen atom or a methyl group, and $R^8$ is a linear or branched alkylene group having 1 to 8 carbon atoms.).

The monomer (a-5) of the present invention is a (meth)acrylamide monomer (a-5) having a hydroxyl group represented by General Formula (5):

[Formula 8]

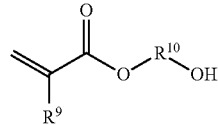

(5)

(wherein $R^9$ is a hydrogen atom or a methyl group, and $R^{10}$ is a linear or branched alkylene group having 1 to 8 carbon atoms.).

Examples of the linear or branched alkylene group having 1 to 8 carbon atoms in the General Formula (4) include a methylene group, an ethylene group, an n-propylene group, an n-butylene group, an i-butylene group, an n-pentylene group, an n-hexylene group, and an n-octylene group. The alkylene group is preferably a linear alkylene group having 1 to 4 carbon atoms from the viewpoint that the antifogging properties of the antifogging film can be enhanced. The monomer (a-4) may be used singly or in combination of two or more types thereof.

Examples of the linear or branched alkylene group having 1 to 8 carbon atoms in the General Formula (5) include a methylene group, an ethylene group, an n-propylene group, an n-butylene group, an i-butylene group, an n-pentylene group, an n-hexylene group, and an n-octylene group. The alkylene group is preferably a linear alkylene group having 1 to 4 carbon atoms from the viewpoint that the antifogging properties of the antifogging film can be enhanced. The monomer (a-5) may be used singly or in combination of two or more types thereof.

When the monomer (a-4) and/or monomer (a-5) is used, the amount of the monomer (a-4) and/or monomer (a-5) is preferably 30 parts by mass or less, and more preferably 15 parts by mass or less relative to 100 parts by mass of the total of the monomer (a-1), the monomer (a-2), and the monomer (a-3) from the viewpoint of improving the adhesion of the antifogging film.

When the monomer (a-4) and/or the monomer (a-5) is used, the total proportion of the monomer (a-1), the monomer (a-2), the monomer (a-3), the monomer (a-4) and/or the monomer (a-5) in the monomer mixture is preferably 80 mass % or more, more preferably 90 mass % or more, and still more preferably 95 mass % or more.

<Method for Producing Copolymer (A)>

The copolymer (A) of the present invention is obtained by copolymerizing the monomer mixture. The copolymer may have any structure such as a random copolymer, an alternating copolymer, a block copolymer, and a graft copolymer, but from the viewpoint that the effect of the antifoggant composition, such as antifogging properties, can be improved and the antifoggant composition can easily be prepared, the copolymer is preferably a random copolymer. Examples of the polymerization method used for obtaining the copolymer include various publicly-known polymerization methods such as radical polymerization, cationic polymerization, anionic living polymerization, and cationic living polymerization, but in terms of ease of industrial production and a wide variety of performance properties, radical polymerization is particularly preferable. As radical polymerization, conventional bulk polymerization, suspension polymerization, solution polymerization, or emulsion polymerization may be employed, but from the viewpoint that an obtained product can directly be used as an antifoggant composition after polymerization, solution polymerization is preferable.

Examples of the polymerization solvent used in the solution polymerization include alcohol solvents such as water, methanol, ethanol, propanol, i-propanol, and diacetone alcohol; alcohol ether solvents such as ethylene glycol monomethyl ether, ethylene glycol monoethyl ether, propylene glycol monomethyl ether, propylene glycol monoethyl ether, 3-methoxybutanol, and 3-methoxy-3-methylbutanol; ketone solvents such as acetone, methyl ethyl ketone, methyl isobutyl ketone, and cyclohexanone; ether solvents such as tetrahydrofuran and dioxane; ester solvents such as methyl acetate, ethyl acetate, n-butyl acetate, isobutyl acetate, t-butyl acetate, methyl lactate, and ethyl lactate; aromatic solvents such as benzene, toluene, and xylene; and amide solvents such as formamide and dimethylformamide. Among them, water, alcohol solvents, and alcohol ether solvents are preferable. The polymerization solvent may be used singly or in combination of two or more types thereof.

As the radical polymerization initiator, radical polymerization initiators generally used, such as an organic peroxide or an azo compound, may be used. Examples of the organic peroxide include benzoyl peroxide, 3,5,5-trimethylhexanoyl peroxide, t-butyl peroxy-2-hexanoatelate, t-butyl peroxy pivalate, and t-hexyl peroxy pivalate. Examples of the azo compound include 2,2'-azobisisobutyronitrile and 2,2'-azobis-2-methylbutyronitrile. The radical polymerization initiator may be used singly or in combination of two or more types thereof.

The amount of the radical polymerization initiator to be added is preferably 0.01 to 5 parts by mass relative to 100 parts by mass of the monomer mixture. The radical polymerization initiator is preferably added dropwise into a reaction vessel during polymerization in terms of ease of control of heat generated by polymerization. The temperature at which a polymerization reaction is performed is appropriately changed depending on the type of the radical polymerization initiator to be used, but is preferably 30 to 150° C., more preferably 40 to 100° C. in terms of industrial production.

The number average molecular weight (Mn) of the copolymer (A) is preferably 3,000 or more, and more preferably 5,000 or more from the viewpoint of imparting water resistance to the antifogging film. The number average molecular weight (Mn) of the copolymer (A) is preferably 300,000 or less, and more preferably 200,000 or less from the viewpoint of improving the coatability and handleability of the antifoggant composition.

The number average molecular weight (Mn) of the copolymer (A) can be determined by GPC.

<Measurement Conditions of Number Average Molecular Weight (Mn)>

Analyzer: HLC-8320GPC (manufactured by TOSOH CORPORATION)
Guard column: TSKgel guardcolumn SuperMP (HZ) M (manufactured by TOSOH CORPORATION)
First column: TSKgelcolumn multipore HZ-M (manufactured by TOSOH CORPORATION)
Second column: TSKgelcolumn multipore HZ-M (manufactured by TOSOH CORPORATION)
Detector: differential refractometer
Column temperature: 40° C.
Developing solvent: tetrahydrofuran
Reference material: polystyrene
Flow rate: 0.350 mL/min
Sample concentration: 0.2 mass %
Injection amount: 10 µL The OH mol amount contained in 100 parts by mass of the copolymer A is calculated by the following formula.

Formula: {parts by mass of monomer having hydroxyl group in 100 parts by mass of total of monomers that constitute copolymer A}/{molecular weight of monomer having hydroxyl group}

<Blocked Polyisocyanate Curing Agent (B)>

The blocked polyisocyanate curing agent (B) of the present invention is a compound having two or more blocked isocyanate groups. The blocked polyisocyanate curing agent (B) may be used singly or in combination of two or more types thereof.

Examples of the blocked polyisocyanate curing agent (B) include those produced by blocking isocyanate groups contained in polyisocyanate derivatives with a blocking agent such as hexamethylene diisocyanate, isophorone diisocyanate, tolylene diisocyanate, diphenylmethane diisocyanate, xylene diisocyanate, dicyclohexylmethane-4,4'-diisocyanate, biuret forms and isocyanurate forms thereof, and adduct forms of trimethylolpropane thereof.

Examples of the blocking agent include alcohols such as methanol, ethanol, n-propanol, i-propanol, n-butanol, and 1-methoxy-2-propanol; oximes such as formamide oxime, acetaldo oxime, acetoxime, methyl ethyl ketoxime, diacetyl monoxime, benzophenone oxime, and cyclohexanone oxime; pyrazoles such as dimethylpyrazole, diethylpyrazole, and diisopropylpyrazole; and dialkyl malonates such as dimethyl malonate, diethyl malonate, dipropyl malonate, and dibutyl malonate. From the viewpoint of achieving curing at a low temperature in a short time, the blocking agent derivation is preferably pyrazoles, oximes, or dialkyl malonates, and more preferably dimethylpyrazole, diethylpyrazole, acetoxime, methyl ethyl ketoxime, dimethyl malonate, or diethyl malonate.

Examples of commercially available products of the blocked polyisocyanate curing agent (B) include those of trade names: "DURANATE MF-K60B", "DURANATE SBB-70P", "DURANATE SBN-70D", "DURANATE MF-B60B", "DURANATE 17B-60P", "DURANATE TPA-B80E", "DURANATE E420-B80B", "DURANATE WM44-L70G" (manufactured by Asahi Kasei Corporation), those of trade names: "Aqua BI200", "Aqua BI220" (manufactured by Baxenden), those of trade names: "MEIKANATE CX", "SU268A" (manufactured by Meisei Chemical Works, Ltd.), and those of trade names: "CORONATE BI-301", "CORONATE 2507", "CORONATE 2554" (manufactured by TOSOH CORPORATION).

The blocked polyisocyanate curing agent (B) of the present invention may be a (meth)acrylate polymer and/or copolymer having a blocked isocyanate group. The (meth) acrylate polymer and/or copolymer having a blocked isocyanate group is a polymer obtained from a vinyl monomer having a blocked isocyanate group, or a copolymer obtained from a monomer mixture containing a radically polymerizable vinyl monomer not having a blocked isocyanate group copolymerizable with a radically polymerizable vinyl monomer having a blocked isocyanate group.

Examples of the vinyl monomer having a blocked isocyanate group include compounds obtained by blocking a vinyl monomer having an isocyanate group with a blocking agent such as isocyanate ethyl (meth)acrylate, isocyanate ethyl (meth)acrylamide, isocyanate propyl (meth)acrylate, isocyanate propyl (meth)acrylamide, isocyanate butyl (meth)acrylate, and isocyanate butyl (meth)acrylamide. Examples of the blocking agent include alcohols, oximes, active methylenes, and pyrazoles, and from the viewpoint of deblocking efficiency, oximes, active methylenes, and pyrazoles are preferable. Oximes are not particularly limited, and examples thereof include formamide oxime, acetaldoxime, acetoxime, methyl ethyl ketoxime, diacetyl monoxime, benzophenone oxime, and cyclohexanone oxime. Active methylenes are not particularly limited, and examples thereof include dimethyl malonate, diethyl malonate, ethyl acetoacetate, methyl acetoacetate, and acetylacetone. Pyrazoles include dimethylpyrazole, diethylpyrazole, and diisopropylpyrazole.

Examples of the vinyl monomer not having a blocked isocyanate group include alkyl (meth)acrylates such as methyl (meth)acrylate, ethyl (meth)acrylate, propyl (meth)acrylate, isopropyl (meth)acrylate, butyl (meth)acrylate, isobutyl (meth)acrylate, ethylhexyl (meth)acrylate, octyl (meth)acrylate, lauryl (meth)acrylate, cecyl (meth)acrylate), cyclohexyl (meth)acrylate, benzyl (meth)acrylate, and dicyclopentadienyl (meth)acrylate;

dialkyl (meth)acrylamides such as (meth)acrylamide, dimethyl (meth)acrylamide, diethyl (meth)acrylamide, dipropyl (meth)acrylamide, dibutyl (meth)acrylamide, and dioctyl (meth)acrylamide; morpholine-containing vinyl compounds such as (meth)acryloyl morpholine and (meth) allyl morpholine; sulfonic acid group-containing vinyl monomers such as sulfoethyl (meth)acrylate, sodium sulfoethyl (meth)acrylate, t-butyl (meth)acrylamide sulfonic acid, and sodium t-butyl (meth)acrylamide sulfonate; (meth) acrylic acids such as (meth)acrylic acid, sodium (meth) acrylate, and potassium (meth)acrylate, or salt compounds thereof; glycidyl (meth)acrylate; trifluoroethyl (meth)acrylate; polysiloxane-containing (meth)acrylate; aromatic vinyl compounds such as styrene, vinyltoluene, and α-methylstyrene; vinyl cyanide compounds such as acrylonitrile and methacrylonitrile; amino group-containing (meth)acrylates such as dimethylaminoethyl (meth)acrylate, diethylaminoethyl (meth)acrylate, and diethylaminopropyl (meth)acrylate; alkylene oxide-modified (meth)acrylates such as terminal methoxy polyethylene glycol (meth)acrylate and terminal methoxy polypropylene glycol (meth)acrylate; vinyl acetate compounds such as vinyl acetate, vinyl chloroacetate, and vinyl trifluoroacetate; and vinyl amide compounds such as N-vinylformamide, N-vinylacetamide, and N-vinylpyrrolidone.

From the viewpoint of improving the transparency of the antifogging film, the (meth)acrylate copolymer having a blocked isocyanate group is preferably a (meth)acrylate copolymer obtained from a monomer mixture containing an N,N-dialkyl (meth)acrylamide monomer (b-1) represented by General Formula (6):

[Formula 9]

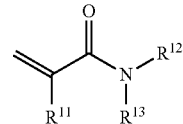

(6)

(wherein $R^{11}$ is a hydrogen atom or a methyl group, and $R^{12}$ and $R^{13}$ are independently a linear or branched alkyl group having 1 to 8 carbon atoms.);

a (meth)acrylate monomer (b-2) having a blocked isocyanate group represented by

General Formula (7):

[Formula 10]

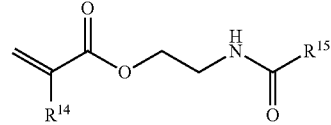

(7)

(wherein $R^{14}$ is a hydrogen atom or a methyl group, and $R^{15}$ is a residue derived from a blocking agent.); and a (meth)acrylate monomer (b-3) having a hydrocarbon group represented by General Formula (8):

[Formula 11]

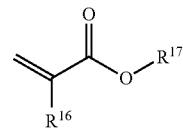

(8)

(wherein $R^{16}$ is a hydrogen atom or a methyl group, and $R^{17}$ is a linear, branched, or cyclic hydrocarbon group having 1 to 22 carbon atoms.).

Examples of the linear or branched alkyl group having 1 to 8 carbon atoms in the General Formula (6) include a methyl group, an ethyl group, an n-propyl group, an i-propyl group, an n-butyl group, an i-butyl group, a t-butyl group, an n-amyl group, an i-amyl group, a t-amyl group, an n-hexyl group, an n-octyl group, and a 2-ethylhexyl group. From the viewpoint that the antifogging performance of the antifogging film can be increased, the alkyl group is preferably a linear or branched alkyl group having 1 to 4 carbon atoms, more preferably a methyl group or an ethyl group, and still more preferably a methyl group. The monomer (b-1) may be used singly or in combination of two or more types thereof.

Examples of the residue derived from a blocking agent in the General Formula (7) include alcohols such as methanol, ethanol, n-propanol, i-propanol, n-butanol, and 1-methoxy-2-propanol; oximes such as formamide oxime, acetaldoxime, acetoxime, methyl ethyl ketoxime, diacetyl monoxime, benzophenone oxime, and cyclohexanone oxime; pyrazoles such as dimethylpyrazole, diethylpyrazole, and diisopropylpyrazole; and dialkyl malonates such as dimethyl malonate, diethyl malonate, dipropyl malonate, and dibutyl malonate. From the viewpoint of achieving curing at a low temperature in a short time, the residue derived from a blocking agent is preferably pyrazoles, oximes, or dialkyl malonates, and more preferably dimethylpyrazole, diethylpyrazole, acetoxime, methyl ethyl ketoxime, dimethyl malonate, or diethyl malonate. The monomer (b-2) may be used singly or in combination of two or more types thereof.

Examples of the linear, branched, or cyclic hydrocarbon group having 1 to 22 carbon atoms in the General Formula (8) include alkyl groups such as a methyl group, an ethyl group, an n-propyl group, an i-propyl group, an n-butyl group, an i-butyl group, a t-butyl group, an n-amyl group, an i-amyl group, a t-amyl group, an n-hexyl group, a cyclohexyl group, an n-octyl group, a 2-ethylhexyl group, an n-nonyl group, an isobornyl group, a lauryl group, a myristyl group, a cetyl group, a stearyl group, and a behenyl group; alkenyl groups such as an oleyl group; and aryl groups such as a phenyl group. The hydrocarbon group is preferably a linear, branched, or cyclic hydrocarbon group having 2 to 18 carbon atoms, and more preferably a linear, branched, or cyclic hydrocarbon group having 4 to 16 carbon atoms from the viewpoint that the water resistance of the antifogging film can be increased. The monomer (b-3) may be used singly or in combination of two or more types thereof.

The amount of the monomer (b-1) is preferably 20 to 90 parts by mass in 100 parts by mass of the total of the monomer (b-1), the monomer (b-2), and the monomer (b-3). From the viewpoint of improving the antifogging properties of the antifogging film, the amount of the monomer (b-1) is preferably 30 parts by mass or more, more preferably 40 parts by mass or more in 100 parts by mass of the total of the monomer (b-1), the monomer (b-2), and the monomer (b-3), and from the viewpoint of improving the water resistance of the antifogging film, the amount of the monomer (b-1) is preferably 80 parts by mass or less, more preferably 70 parts by mass or less in 100 parts by mass of the total of the monomer (b-1), the monomer (b-2), and the monomer (b-3).

The amount of the monomer (b-2) is preferably 5 to 50 parts by mass in 100 parts by mass of the total of the monomer (b-1), the monomer (b-2), and the monomer (b-3). From the viewpoint of improving the water resistance of the antifogging film, the amount of the monomer (b-2) is more preferably 10 parts by mass or more in 100 parts by mass of the total of the monomer (b-1), the monomer (b-2), and the monomer (b-3), and from the viewpoint of improving the adhesion of the antifogging film, the amount of the monomer (b-2) is more preferably 45 parts by mass or less, still preferably 35 parts by mass or less in 100 parts by mass of the total of the monomer (b-1), the monomer (b-2), and the monomer (b-3).

The amount of the monomer (b-3) is preferably 1 to 40 parts by mass in 100 parts by mass of the total of the monomer (b-1), the monomer (b-2), and the monomer (b-3). From the viewpoint of improving the water resistance of the antifogging film, the amount of the monomer (b-3) is more preferably 5 parts by mass or more, still preferably 10 parts by mass or more in 100 parts by mass of the total of the monomer (b-1), the monomer (b-2), and the monomer (b-3), and from the viewpoint of improving the antifogging properties of the antifogging film, the amount of the monomer (b-3) is more preferably 35 parts by mass or less, more preferably 30 parts by mass or less in 100 parts by mass of the total of the monomer (b-1), the monomer (b-2), and the monomer (b-3).

The amount of the blocked polyisocyanate curing agent (B) is 35 parts by mass or more and 300 parts by mass or less relative to 100 parts by mass of the copolymer (A). From the viewpoint of improving the water resistance of the antifogging film, the amount of the blocked polyisocyanate curing agent (B) is preferably 50 parts by mass or more, more preferably 70 parts by mass or more relative to 100 parts by mass of the copolymer (A), and from the viewpoint of improving the adhesion, the amount of the blocked polyisocyanate curing agent (B) is preferably 250 parts by mass or less, more preferably 200 parts by mass or less relative to 100 parts by mass of the copolymer (A).

For the copolymer (A) and the blocked polyisocyanate curing agent (B), the NCO/OH ratio of the content of isocyanate groups (NCO) produced after deblocking of the blocking agent of blocked isocyanate groups contained in the blocked polyisocyanate curing agent (B) to the content of hydroxyl groups (OH) of the copolymer (A) (hereinafter, NCO/OH ratio) is preferably within the range of 0.2 to 2.5. From the viewpoint of improving the water resistance of the antifogging film, the NCO/OH ratio is more preferably 0.3 or more, the NCO/OH ratio is still more preferably 0.5 or more, and from the viewpoint of improving the adhesion, the NCO/OH ratio is more preferably 2.0 or less, and the NCO/OH ratio is still more preferably 1.5 or less.

<Method for Producing (Meth)Acrylate Polymer and/or Copolymer Having a Blocked Isocyanate Group>

The (meth)acrylate polymer and/or copolymer having a blocked isocyanate group of the present invention is obtained by copolymerizing the monomer mixture. The copolymer may have any structure such as a random copolymer, an alternating copolymer, a block copolymer, and a graft copolymer, but from the viewpoint that the effect of the antifoggant composition, such as antifogging properties, can be improved and the antifoggant composition can easily be prepared, the copolymer is preferably a random copolymer. Examples of the polymerization method used for obtaining the copolymer include various publicly-known polymerization methods such as radical polymerization, cationic polymerization, anionic living polymerization, and cationic living polymerization, but in terms of ease of industrial production and a wide variety of performance properties, radical polymerization is particularly preferable. As radical polymerization, conventional bulk polymerization, suspension polymerization, solution polymerization, or emulsion polymerization may be employed, but from the viewpoint that an obtained product can directly be used as an antifoggant composition after polymerization, solution polymerization is preferable.

Examples of the polymerization solvent used in the solution polymerization include alcohol solvents such as water, methanol, ethanol, propanol, i-propanol, and diacetone alcohol; alcohol ether solvents such as ethylene glycol monomethyl ether, ethylene glycol monoethyl ether, propylene glycol monomethyl ether, propylene glycol monoethyl ether, 3-methoxybutanol, and 3-methoxy-3-methylbutanol; ketone solvents such as acetone, methyl ethyl ketone, methyl isobutyl ketone, and cyclohexanone; ether solvents such as tetrahydrofuran and dioxane; ester solvents such as methyl acetate, ethyl acetate, n-butyl acetate, isobutyl acetate, t-butyl acetate, methyl lactate, and ethyl lactate; aromatic solvents such as benzene, toluene, and xylene; and amide solvents such as formamide and dimethylformamide. Among them, water, alcohol solvents, and alcohol ether solvents are preferable. The polymerization solvent may be used singly or in combination of two or more types thereof.

As the radical polymerization initiator, radical polymerization initiators generally used, such as an organic peroxide or an azo compound, may be used. Examples of the organic peroxide include benzoyl peroxide, 3,5,5-trimethylhexanoyl peroxide, t-butyl peroxy-2-hexanoatelate, t-butyl peroxy pivalate, and t-hexyl peroxy pivalate. Examples of the azo compound include 2,2'-azobisisobutyronitrile and 2,2'-azobis methylbutyronitrile. The radical polymerization initiator may be used singly or in combination of two or more types thereof.

The amount of the radical polymerization initiator to be added is preferably 0.01 to 5 parts by mass relative to 100 parts by mass of the monomer mixture. The radical polymerization initiator is preferably added dropwise into a reaction vessel during polymerization in terms of ease of control of heat generated by polymerization. The temperature at which a polymerization reaction is performed is appropriately changed depending on the type of the radical polymerization initiator to be used, but is preferably 30 to 150° C., more preferably 40 to 100° C. in terms of industrial production.

From the viewpoint of imparting water resistance to the antifogging film, the number average molecular weight (Mn) of the (meth)acrylate polymer and/or copolymer having a blocked isocyanate group is preferably 1,000 or more, and more preferably 3,000 or more. The number average molecular weight (Mn) of the copolymer (A) is preferably 300,000 or less, and more preferably 200,000 or less from the viewpoint of improving the coatability and handleability of the antifoggant composition.

The number average molecular weight (Mn) of the acrylate polymer and/or copolymer having a blocked isocyanate group can be determined by a GPC method.

<Measurement Conditions of Number Average Molecular Weight (Mn)>

Analyzer: HLC-8320GPC (manufactured by TOSOH CORPORATION)

Guard column: TSKgel guardcolumn SuperMP (HZ) M (manufactured by TOSOH CORPORATION)

First column: TSKgelcolumn multipore HZ-M (manufactured by TOSOH CORPORATION)

Second column: TSKgelcolumn multipore HZ-M (manufactured by TOSOH CORPORATION)

Detector: differential refractometer

Column temperature: 40° C.

Developing solvent: tetrahydrofuran

Reference material: polystyrene

Flow rate: 0.350 mL/min

Sample concentration: 0.2 mass %

Injection amount: 10 µL

The NCO mol amount contained in 100 parts by mass of the (meth)acrylate polymer and/or copolymer (B) having a blocked isocyanate group is calculated by the following formula.

Formula: {parts by mass of monomer having blocked isocyanate group in 100 parts by mass of the total of monomers that constitute copolymer (B)}/{molecular weight of monomer having blocked isocyanate group}

<Colloidal Silica (C)>

The colloidal silica (C) of the present invention is in a state in which silica particles represented by a chemical composition formula of $SiO_2$ are dispersed in a medium to form a colloid. Examples of the medium include methanol, ethanol, i-propyl alcohol, n-butanol, xylene, dimethylformamide, and water. Among them, methanol, ethanol, and water are preferable, and water is more preferable. The colloidal silica (C) may be one in which the surface of silica particles is modified with a surface treatment agent such as a silane compound. The colloidal silica (C) may be used singly or in combination of two or more types thereof.

The colloidal silica (C) preferably has an average particle diameter of 10 to 100 nm, and more preferably has an average particle diameter of 10 to 30 nm. The average particle diameter is an average primary particle diameter, and is represented by a median diameter (D50) of a volume-based particle size distribution measured by dynamic light scattering. When the average particle diameter is less than 10 nm, the adhesion of the resulting antifogging film to the base material tends to decrease, and when the average particle diameter is more than 100 nm, the transparency of the resulting antifogging film tends to decrease. Examples of the shape of the colloidal silica (C) include a particle shape, a chain shape, and a pearl necklace shape. Among them, the shape is preferably a particle shape from the viewpoint of increasing the transparency of the antifogging film.

Examples of commercially available products of the colloidal silica (C) include those of trade names: "SNOWTEX-XS", "SNOWTEX-S", "SNOWTEX-30", "SNOWTEX-50-T", "SNOWTEX-30 L", "SNOWTEX-YL", "SNOWTEX-ZL", "SNOWTEX-MP-1040", "SNOWTEX-UP", "SNOWTEX-PS-S", "SNOWTEX-PS-M", "SNOWTEX-OXS", "SNOWTEX-OS", "SNOWTEX-O", "SNOWTEX-O-40", "SNOWTEX-OL", "SNOWTEX-OYL", "SNOW-TEX-OUP", "SNOWTEX-PS-SO", "SNOWTEX-PS-MO", "SNOWTEX-NXS", "SNOWTEX-NS", "SNOWTEX-N", "SNOWTEX-N-40", "SNOWTEX-CXS", "SNOWTEX-C", "SNOWTEX-CM", "SNOWTEX-AK", "SNOWTEX-AK-L", and "SNOWTEX-AK-Y" (manufactured by Nissan Chemical Corporation). Among them, "SNOWTEX-O", "SNOWTEX-O-40", "SNOWTEX-OL", "SNOWTEX-OYL", "SNOWTEX-N", and "SNOWTEX-N-40" having an average particle diameter of 10 to 100 nm and a particle shape are preferable, and "SNOWTEX-O", "SNOWTEX-O-40", "SNOWTEX-N", and "SNOWTEX-N-40" having an average particle diameter of 10 to 30 nm and a particle shape are more preferable.

The amount of the colloidal silica (C) is 80 parts by mass or more and 600 parts by mass or less relative to 100 parts by mass of the copolymer (A). From the viewpoint of improving the water resistance of the antifogging film, the amount of the colloidal silica (C) is preferably 100 parts by mass or more, more preferably 150 parts by mass or more relative to 100 parts by mass of the copolymer (A), and from the viewpoint of improving the adhesion and the transparency, the amount of the colloidal silica (C) is preferably 400 parts by mass or less, more preferably 300 parts by mass or less relative to 100 parts by mass of the copolymer (A).

<Surfactant (D)>

The surfactant (D) of the present invention is at least one selected from the group consisting of an anionic surfactant, a cationic surfactant, a nonionic surfactant, and an amphoteric surfactant.

Examples of the anionic surfactant include fatty acid salts such as fatty acid alkali metal salts such as sodium oleate and potassium oleate; higher alcohol sulfuric acid esters such as sodium lauryl sulfate and ammonium lauryl sulfate; alkylbenzenesulfonates and alkylnaphthalenesulfonates such as sodium dodecylbenzenesulfonate and sodium alkylnaphthalenesulfonate; polyoxyethylene sulfate salts such as naphthalene sulfonic acid formalin condensate, dialkyl sulfosuccinate salt, dialkyl phosphate salt, and sodium polyoxyethylene alkyl phenyl ether sulfate; and fluorine-containing anionic surfactants such as perfluoroalkyl carboxylate, perfluoroalkyl sulfonate, and perfluoroalkyl phosphate.

Examples of the cationic surfactant include amine salts such as ethanolamines, laurylamine acetate, triethanolamine monoformate, and stearamidoethyldiethylamine acetate; and quaternary ammonium salts such as lauryltrimethylammonium chloride, stearyltrimethylammonium chloride, dilauryldimethylammonium chloride, distearyldimethylammonium chloride, lauryldimethylbenzylammonium chloride, stearyldimethylbenzylammonium chloride, tetrabutylammonium bromide, and lauryltrimethylammonium bromide.

Examples of the nonionic surfactant include polyoxyethylene higher alcohol ethers such as polyoxyethylene isodecyl ether, polyoxyethylene lauryl ether, and polyoxyethylene oleyl ether; polyoxyethylene alkyl aryl ethers such as polyoxyethylene octylphenol and polyoxyethylene nonylphenol; polyoxyethylene acyl esters such as polyoxyethylene monolaurate and polyoxyethylene monostearate; polyoxyethylene sorbitan fatty acid esters such as polypropylene glycol ethylene oxide adduct, polyoxyethylene sorbitan monolaurate, and polyoxyethylene sorbitan monostearate; phosphoric acid esters such as alkyl phosphoric acid ester and polyoxyethylene alkyl ether phosphoric acid ester; and sugar esters and cellulose ethers.

Examples of the amphoteric surfactant include fatty acid zwitterionic surfactants such as dimethylalkyllaurylbetaine, dimethylalkylstearylbetaine, lauryldimethylaminoacetic acid betaine, and laurylamidopropyldimethylaminoacetic acid betaine; sulfonic acid zwitterionic surfactants such as dimethylalkylsulfobetaine; and alkylglycine.

The surfactant (D) is preferably an anionic surfactant alone, a combination of an anionic surfactant and a cationic surfactant, or a combination of an anionic surfactant and an amphoteric surfactant from the viewpoint of obtaining good antifogging performance with a relatively small amount. In particular, when the anionic surfactant is a fluorine-containing anionic surfactant, the surface tension of the antifogging film to water can be better reduced, so that higher antifogging performance can be obtained.

The amount of the surfactant (D) is preferably 1 part by mass or more and 35 parts by mass or less relative to 100 parts by mass of the copolymer (A). The amount of the surfactant (D) is more preferably 3 parts by mass or more, still more preferably 5 parts by mass or more relative to 100 parts by mass of the copolymer (A) from the viewpoint of improving the antifogging properties of the antifogging film, and the amount of the surfactant (D) is more preferably 30 parts by mass or less, still more preferably 25 parts by mass or less relative to 100 parts by mass of the copolymer (A) from the viewpoint of improving the transparency.

<Water (E)>

The water (E) of the present invention is a medium containing water as a main component, such as ion-exchanged water, distilled water, and industrial water.

The amount of the water (E) is 650 parts by mass or more relative to 100 parts by mass of the copolymer (A). The amount of the water (E) is preferably 1000 parts by mass or more relative to 100 parts by mass of the copolymer (A) from the viewpoint of reducing the viscosity of the antifoggant composition and improving the coating workability, and the amount of the water (E) is preferably 4500 parts by mass or less and more preferably 3500 parts by mass or less from the viewpoint of appropriately maintaining the viscosity of the antifoggant composition and improving the coating workability.

The antifoggant composition of the present invention may contain an organic solvent from the viewpoint of improving coating workability or from the viewpoint of use as a polymerization reaction solvent in synthesizing the copolymer (A).

Examples of the organic solvent include those same as the polymerization solvent. Among these, alcohol solvents and alcohol ether solvents are preferable, propanol, isopropanol, diacetone alcohol, propylene glycol monomethyl ether, propylene glycol monoethyl ether, 3-methoxybutanol, and 3-methoxy-3-methylbutanol are more preferable, and propanol, isopropanol, diacetone alcohol, propylene glycol monomethyl ether, 3-methoxybutanol, and 3-methoxy methylbutanol are still more preferable from the viewpoint that solvent cracking is relatively less likely to occur. The organic solvent may be used singly or in combination of two or more types thereof.

When the antifoggant composition of the present invention contains the organic solvent, the mass ratio of the organic solvent to the water (E) (organic solvent/water (E)) is preferably 0.3 or less, and more preferably 0.2 or less from the viewpoint of suppressing occurrence of solvent cracking.

When the antifoggant composition of the present invention contains the organic solvent, the amount of the organic solvent (VOC amount) is preferably 150 g/L or less from the viewpoint of environmental consideration. The VOC amount is calculated by multiplying the mass of the organic solvent contained in 1 kg of the antifoggant composition by the specific gravity of the antifoggant composition.

A curing catalyst may be added to the antifoggant composition of the present invention from the viewpoint that the composition can be heat-cured at a low temperature in a short time.

Examples of the curing catalyst include fatty acid alkali metal salts such as sodium laurate, potassium laurate, calcium laurate, barium laurate, sodium oleate, potassium oleate, calcium oleate, barium oleate, sodium stearate, potassium stearate, calcium stearate, barium stearate, and fluoroalkyl fatty acid sodium salt; inorganic acids such as hydrochloric acid, sulfuric acid, nitric acid, and phosphoric acid; aromatic sulfonic acids such as p-toluenesulfonic acid, dodecylbenzenesulfonic acid, and naphthalenesulfonic acid; and tertiary amines such as tetramethylbutanediamine, 1,4-diazabicyclo[2,2,2]octane, 1,8-diazabicyclo[5,4,0]-7-undecene, and 1,5-diazabicyclo[4,3,0]-5-nonene. Among them, fatty acid alkali metal salts are preferable, sodium laurate, potassium laurate, calcium laurate, barium laurate, sodium oleate, potassium oleate, calcium oleate, barium oleate, sodium stearate, potassium stearate, calcium stearate, and barium stearate are preferable, and sodium laurate, potassium laurate, sodium oleate, potassium oleate, sodium stearate, and potassium stearate are more preferable from the viewpoint of improving the low-temperature curability. The curing catalyst may be used singly or in combination of two or more types thereof.

When the curing catalyst is used, the amount of the curing catalyst is preferably 0.01 to 30 parts by mass, more preferably 0.05 to 15 parts by mass, and still more preferably 0.1 to 10 parts by mass relative to 100 parts by mass of the copolymer (A). When a fatty acid alkali metal salt is selected as the surfactant (D) and the curing catalyst, the amount of the fatty acid alkali metal salt used may be 20 parts by mass or less relative to 100 parts by mass of the copolymer (A).

A leveling agent may be added to the antifoggant composition of the present invention from the viewpoint of making the surface of the antifogging film smoother.

Examples of the leveling agent include polyether-modified polydimethylsiloxane, polyether-modified polydimethylpolysiloxane, polyether macromer-modified acrylate, acrylic polymers, and acrylic silicon polymers.

Examples of commercially available products of the leveling agent include those of trade names: "BYK-300", "BYK-320", "BYK-306", "BYK-307", "BYK-310", "BYK-313", "BYK-315N", "BYK-320", "BYK-322", "BYK-323", "BYK-325", "BYK-330", "BYK-331", "BYK-333", "BYK-342", "BYK-345/346", "BYK-347", "BYK-348", "BYK-349", "BYK-370", "BYK-377", "BYK-378", "BYK-3455", and "BYK-3560" (manufactured by BYK), those of trade names: "KP-323", "KP-341", "KP-104", "KP-110", "KP-112", "KF-351A", "KF-352A", "KF-353", "KF-354L", "KF-355A", "KF-651A", "KF-945", "KF-640", and "KF-642" (manufactured by Shin-Etsu Chemical Co., Ltd.), and those of trade names: "DISPARLON 1970", "DISPARLON 230", "DISPARLON 1711EF", "DISPARLON 1761", "DISPARLON LS-001", "DISPARLON LS-050", "DISPARLON LS-460", and "DISPARLON LS-480" (manufactured by Kusumoto Chemicals, Ltd.). The leveling agent may be used singly or in combination of two or more types thereof.

When the leveling agent is used, the amount of the leveling agent is preferably 0.05 to 25 parts by mass, more preferably 0.10 to 25 parts by mass, and still more preferably 0.5 to 20 parts by mass relative to 100 parts by mass of the copolymer (A).

If necessary, the antifoggant composition of the present invention may contain, as other components, conventional various additives such as an antioxidant, a UV absorber, and a light stabilizer, in addition to the above components. Each of the additives as other components may be added in a conventional amount, but the amount of each of the additives to be added is usually 10 parts by mass or less relative to 100 parts by mass of the copolymer (A).

<Anti-Fog Article>

The anti-fog article of the present invention is obtained by applying the antifoggant composition onto a base material (object to be coated) by an application method used for a conventional coating material and heat-curing the antifoggant composition so that an antifogging film is formed on the surface of the base material (object to be coated). A drying step can be provided before the step of heat-curing for the purpose of volatilizing and drying the solvent contained in the antifogging film immediately after coating.

The type of the base material (object to be coated) is not particularly limited, and examples thereof include resin base materials such as a polymethyl methacrylate resin, a polycarbonate resin, a polystyrene resin, an acrylonitrile-styrene copolymer resin, a polyvinyl chloride resin, an acetate resin, an ABS resin, a polyester resin, and a polyamide resin; and inorganic base materials such as glass. The shape of the base material is not limited, and examples thereof include a film, a sheet, and a molded article having a three-dimensional shape.

When the antifoggant composition is applied onto the base material (object to be coated), foreign matter adhered to the surface of the base material (object to be coated) is preferably removed before application for the purpose of enhancing the wettability of the antifoggant composition on the base material (object to be coated) to prevent repellence. The removal of foreign matter is performed by, for example, dust removal by high-pressure air or ionized air, ultrasonic cleaning using an aqueous detergent solution or an alcohol solvent, wiping using an alcohol solvent, or cleaning with UV light or ozone. Examples of the application method include dipping, flow coating, roll coating, bar coating, and spray coating.

The drying is usually performed under conditions of a temperature of 20 to 50° C. for 0.5 to 10 minutes.

When the base material is a resin member, the heating temperature is preferably set to be equal to or lower than the heat distortion temperature of the resin member. The heating time is affected by the heating temperature, and thus should be appropriately set. As an example, when the heating temperature is 80° C., the heating time is preferably 10 minutes or more, more preferably 15 minutes or more, and when the heating temperature is 130° C., the heating time is preferably 5 minutes or more, more preferably 10 minutes or more.

The thickness of the antifogging film is preferably about 0.5 to 20 µm, more preferably about 1 to 10 µm from the viewpoint of achieving good antifogging properties and good appearance of coating.

The anti-fog article can be better applied to articles used in an environment where dew condensation easily occurs, and the application thereof is not limited at all. Examples of the anti-fog article include vehicle lighting devices (headlights, auxiliary headlights, vehicle width lights, number lights, tail lights, parking lights, backlight, direction indicator lights, auxiliary direction indicator lights, emergency blinking display and the like) of automobiles, glasses, windows, and mirrors.

EXAMPLES

Hereinbelow, the present invention will be described in more detail with reference to Examples, but the present invention is not limited only to these Examples.

Synthesis Example A-1

<Production of copolymer (A-1)>

Using a reaction vessel equipped with a thermometer, a stirrer, a nitrogen inlet tube, and a condenser tube, 120 g of 3-methoxy-3-methylbutanol was added as a polymerization solvent, stirring was started, and the 3-methoxy-3-methylbutanol was heated to 70° C. while nitrogen gas was blown. Subsequently, the following monomer solution and polymerization initiator solution were added dropwise to the reaction vessel over 2 hours.

Monomer solution: A solution prepared by mixing 50 g of N,N-dimethylacrylamide as a monomer (a-1), 25 g of a 2 mol ε-caprolactone adduct of hydroxyethyl methacrylate ("PLACCEL FM2D", manufactured by Daicel Corporation, molecular weight: 358) as a monomer (a-2), 25 g of cyclohexyl methacrylate as a monomer (a-3), and 20 g of 3-methoxy-3-methylbutanol as a polymerization solvent.

Polymerization initiator solution: A solution prepared by mixing 0.71 g of t-hexylperoxypivalate ("Perhexyl PV", manufactured by NOF CORPORATION, active ingredient: 70 mass %) as a polymerization initiator and 10 g of 3-methoxy-3-methylbutanol as a polymerization solvent.

After completion of the dropwise addition of the monomer solution and the polymerization initiator solution, the solution in the reaction vessel was stirred as it was for 3 hours to produce a copolymer (A-1) solution having a copolymer (A-1) concentration of 40 mass %. The number average molecular weight of the copolymer (A-1) measured by gel permeation chromatography under the measurement conditions described above was 18,000. The amount of FM2D (monomer (a-2)) was 25 parts by mass, the molecular weight was 358 g/mol, and thus the OH mol amount contained in 100 parts by mass (in terms of active ingredient) of copolymer (A-1) was calculated to be 25/358=0.070 mol.

Synthesis Example B-1

<Production of (Meth)Acrylate Copolymer (B-1) Having Blocked Isocyanate Group>

Using a reaction vessel equipped with a thermometer, a stirrer, a nitrogen inlet tube, and a condenser tube, 120 g of 3-methoxy-3-methylbutanol was added as a polymerization solvent, stirring was started, and the 3-methoxy-3-methylbutanol was heated to 70° C. while nitrogen gas was blown. Subsequently, the following monomer solution and polymerization initiator solution were added dropwise to the reaction vessel over 2 hours.

Monomer solution: A solution prepared by mixing 55 g of N,N-dimethylacrylamide as a monomer (b-1), 15 g of diethyl malonate blocked isocyanate group-containing acrylate ("Karenz MOI-DEM") as a monomer (b-2), 30 g of butyl methacrylate as a monomer (b-3), and 20 g of 3-methoxy-3-methylbutanol as the polymerization solvent.

Polymerization initiator solution: A solution prepared by mixing 0.71 g of t-hexylperoxypivalate ("Perhexyl PV", manufactured by NOF CORPORATION, active ingredient: 70 mass %) as a polymerization initiator and 10 g of 3-methoxy-3-methylbutanol as a polymerization solvent.

After completion of the dropwise addition of the monomer solution and the polymerization initiator solution, the solution in the reaction vessel was stirred as it was for 3 hours to produce a copolymer (B-1) solution having a copolymer (B-1) concentration of 40 mass %. The number average molecular weight of the copolymer (A) measured by gel permeation chromatography under the measurement conditions described above was 18,000. The amount of MOI-DEM (monomer (b-2)) was 15 parts by mass, the molecular weight was 315 g/mol, and thus the NCO mol amount contained in 100 parts by mass (in terms of active ingredient) of (meth)acrylate copolymer (B-1) having a blocked isocyanate group was calculated to be 15/315=0.048 mol.

Synthesis Examples A-2 to A-17 and Comparative Synthesis Examples A-18 to A-21

Each solution of copolymers (A) of Synthesis Examples A-2 to A-17 and Comparative Synthesis Examples A-18 to A-21 was produced by the same operations as in Synthesis Example A-1 except that the monomers of Synthesis Example A-1 were changed to the monomers and the compounding amounts thereof shown in Table 1 to 3 in each Synthesis Example and Comparative Synthesis Example.

Synthesis Examples B-2 to B-9

Each solution of blocked polyisocyanate curing agents (B) of Synthesis Examples B-2 to B-9 was produced by the same operations as in Synthesis Example B-1 except that the monomers of Synthesis Example B-1 were changed to the monomers and the compounding amounts thereof shown in Table 4 in each Synthesis Example.

TABLE 1

|  |  |  | Synthesis Examples | | | | | | | | | |
|---|---|---|---|---|---|---|---|---|---|---|---|---|
|  |  |  | A-1 | A-2 | A-3 | A-4 | A-5 | A-6 | A-7 | A-8 | A-9 | A-10 |
| Copolymer (A) [parts by mass] | a-1 | DMAA | 50 | 55 |  | 55 | 65 | 75 | 84 | 35 | 45 | 70 |
|  |  | DEAA |  |  | 55 |  |  |  |  |  |  |  |
|  | a-2 | FA1 |  |  |  |  | 30 | 15 | 13 |  |  | 5 |
|  |  | FA2D |  | 25 | 30 |  |  |  |  |  |  |  |
|  |  | FM2D | 25 |  |  |  |  |  |  |  |  |  |
|  |  | FM3 |  |  |  | 30 |  |  |  |  |  |  |
|  |  | FM5 |  |  |  |  |  |  |  | 35 | 15 |  |
|  |  | FA10L |  |  |  |  |  |  |  |  |  |  |
|  | a-3 | MMA |  |  |  | 15 |  |  |  |  |  |  |
|  |  | EMA |  |  |  |  |  |  |  | 30 |  |  |
|  |  | BMA |  | 10 |  |  |  |  |  |  |  |  |
|  |  | CHMA | 25 |  |  |  |  |  |  |  | 5 | 15 |
|  |  | EHA |  |  | 15 |  |  |  | 3 |  | 35 | 10 |
|  |  | LA |  | 10 |  |  |  | 10 |  |  |  |  |
|  |  | SA |  |  |  |  | 5 |  |  |  |  |  |
|  | a-4 | HEA |  |  |  |  |  |  |  |  |  |  |
|  | a-5 | HEAA |  |  |  |  |  |  |  |  |  |  |
|  |  | OH mol | 0.070 | 0.075 | 0.090 | 0.063 | 0.136 | 0.068 | 0.059 | 0.050 | 0.021 | 0.023 |
|  |  | Total | 100 | 100 | 100 | 100 | 100 | 100 | 100 | 100 | 100 | 100 |

TABLE 2

|  |  |  | Synthesis Examples | | | | | | |
|---|---|---|---|---|---|---|---|---|---|
|  |  |  | A-11 | A-12 | A-13 | A-14 | A-15 | A-16 | A-17 |
| Copolymer (A) [parts by mass] | a-1 | DMAA | 50 | 50 | 50 | 35 | 50 | 55 | 65 |
|  |  | DEAA |  |  |  |  |  |  |  |
|  | a-2 | FA1 |  |  |  |  |  |  |  |
|  |  | FA2D |  |  |  | 25 |  |  |  |
|  |  | FM2D | 40 | 45 |  |  |  |  |  |
|  |  | FM3 |  |  | 15 |  |  | 25 |  |
|  |  | FM5 |  |  |  |  |  |  | 20 |
|  |  | FA10L |  |  |  |  | 35 |  |  |
|  | a-3 | MMA |  |  |  |  |  |  |  |
|  |  | EMA |  |  |  |  |  |  |  |
|  |  | BMA | 10 |  |  | 40 |  |  |  |
|  |  | CHMA |  |  | 35 |  | 5 |  |  |
|  |  | EHA |  | 5 |  |  | 10 | 20 | 15 |
|  |  | LA |  |  |  |  |  |  |  |
|  |  | SA |  |  |  |  |  |  |  |
|  | a-4 | HEA |  |  |  |  |  | 10 |  |
|  | a-5 | HEAA |  |  |  |  |  |  | 20 |
| OH mol |  |  | 0.112 | 0.126 | 0.032 | 0.075 | 0.028 | 0.126 | 0.169 |
| Total |  |  | 100 | 100 | 100 | 100 | 100 | 110 | 120 |

TABLE 3

|  |  |  | Comparative Synthesis Examples | | | |
|---|---|---|---|---|---|---|
|  |  |  | A-18 | A-19 | A-20 | A-21 |
| Copolymer (A) [parts by mass] | a-1 | DMAA |  | 70 | 55 | 70 |
|  |  | DEAA |  |  |  |  |
|  | a-2 | FA1 |  |  |  |  |
|  |  | FA2D |  |  |  |  |
|  |  | FM2D | 45 |  |  | 15 |
|  |  | FM3 |  |  |  |  |
|  |  | FM5 |  |  |  |  |
|  |  | FA10L |  |  |  |  |
|  | a-3 | MMA |  |  |  |  |
|  |  | EMA |  |  |  |  |
|  |  | BMA |  |  |  |  |
|  |  | CHMA | 55 |  |  |  |
|  |  | EHA |  | 30 | 30 |  |
|  |  | LA |  |  |  |  |
|  |  | SA |  |  |  |  |
|  | a-4 | HEA |  |  | 15 |  |
|  | a-5 | HEAA |  |  |  | 15 |
| OH mol |  |  | 0.126 | 0.000 | 0.129 | 0.172 |
| Total |  |  | 100 | 100 | 100 | 100 |

TABLE 4

|  |  |  | Synthesis Examples | | | | | | | | |
|---|---|---|---|---|---|---|---|---|---|---|---|
|  |  |  | B-1 | B-2 | B-3 | B-4 | B-5 | B-6 | B-7 | B-8 | B-9 |
| (Meth)acrylate copolymer having blocked isocyanate group [parts by mass] | b-1 | DMAA | 55 | 60 | 60 |  | 45 | 55 | 60 | 55 | 75 |
|  |  | DEAA |  |  |  | 50 |  |  |  |  |  |
|  | b-2 | MOI-DEM | 15 |  |  |  |  |  |  | 40 |  |
|  |  | AOI-BP |  |  | 20 |  |  |  |  |  | 10 |
|  |  | MOI-BP |  | 25 |  | 25 |  | 10 |  |  |  |
|  |  | AOI-BM |  |  |  |  | 35 |  |  |  |  |
|  |  | MOI-BM |  |  |  |  |  |  | 10 |  |  |
|  | b-3 | BMA | 30 |  | 10 | 10 |  |  |  | 5 |  |
|  |  | CHA |  |  |  | 15 | 5 |  | 30 |  | 5 |
|  |  | EHA |  |  |  |  | 15 | 35 |  |  |  |
|  |  | LA |  | 15 | 10 |  |  |  |  |  | 10 |
| NCO mol |  |  | 0.048 | 0.100 | 0.084 | 0.100 | 0.154 | 0.040 | 0.041 | 0.127 | 0.042 |
| Total |  |  | 100 | 100 | 100 | 100 | 100 | 100 | 100 | 100 | 100 |

In Tables 1 to 4, for monomers (a-1) to (a-5) and (b-1) to (b-3),

DMAA refers to N,N-dimethylacrylamide;

DEAA refers to N,N-diethylacrylamide;

FA1 refers to a 1 mol ε-caprolactone adduct of hydroxyethyl acrylate (trade name: "PLACCEL FA1", manufactured by Daicel Corporation, molecular weight: 230);

FA2D refers to a 2 mol ε-caprolactone adduct of hydroxyethyl acrylate (trade name: "PLACCEL FA2D", manufactured by Daicel Corporation, molecular weight: 344);

FM2D refers to a 2 mol ε-caprolactone adduct of hydroxyethyl methacrylate (trade name: "PLACCEL FM2D", manufactured by Daicel Corporation, molecular weight: 358);

FM3 refers to a 3 mol ε-caprolactone adduct of hydroxyethyl methacrylate (trade name: "PLACCEL FM3", manufactured by Daicel Corporation, molecular weight: 473);

FM5 refers to a 5 mol ε-caprolactone adduct of hydroxyethyl methacrylate (trade name: "PLACCEL FM5", manufactured by Daicel Corporation, molecular weight: 701);

FA 10 L refers to a 10 mol ε-caprolactone adduct of hydroxyethyl acrylate (trade name: "PLACCEL FA 10 L", manufactured by Daicel Corporation, active ingredient: 70 mass %, molecular weight: 1258);

MMA refers to methyl methacrylate;

EMA refers to ethyl methacrylate;

BMA refers to n-butyl methacrylate;

CHMA refers to cyclohexyl methacrylate;

EHA refers to 2-ethylhexyl acrylate;

LA refers to lauryl acrylate;

SA refers to stearyl acrylate;

HEA refers to hydroxyethyl acrylate;

HEAA refers to hydroxyethyl acrylamide;

MOI-DEM refers to malonic diethyl block 2-isocyanatoethyl methacrylate (trade name: "Karenz MOI-DEM", manufactured by SHOWA DENKO K. K., molecular weight: 315);

AOI-BP refers to dimethylpyrazole block 2-isocyanatoethyl acrylate (trade name: "Karenz AOI-BP", manufactured by SHOWA DENKO K. K., molecular weight: 237);

MOI-BP refers to dimethylpyrazole block 2-isocyanatoethyl methacrylate (trade name: "Karenz MOI-BP", manufactured by SHOWA DENKO K. K., molecular weight: 251);

AOI-BM refers to methyl ethyl ketone oxime block 2-isocyanatoethyl acrylate (trade name: "Karenz AOI-BM", manufactured by SHOWA DENKO K. K., molecular weight: 228); and MOI-BM refers to methyl ethyl ketone oxime block 2-isocyanatoethyl methacrylate (trade name: "Karenz MOI-BM", manufactured by SHOWA DENKO K. K., molecular weight: 242).

Example 1

<Production of Antifoggant Composition>

To 250 g of the copolymer (A-1) solution obtained above, 275 g of a copolymer of a (meth)acrylate having a blocked isocyanate group (B-1) as a blocked polyisocyanate curing agent (B), 500 g of water-dispersible silica sol ("SNOTEX O-40" manufactured by Nissan Chemical Corporation, active ingredient: 40 mass %) as a colloidal silica (C), 20 g of sodium di-2-ethylhexyl sulfosuccinate ("RAPIZOL A-80", manufactured by NOF CORPORATION, active ingredient: 80 mass %) as a surfactant (D), and 2945 g of ion-exchanged water as water (E) were added. Furthermore, 1 g of potassium oleate as a curing catalyst and 1 g of polyether-modified polydimethylsiloxane ("KF-351 A", manufactured by Shin-Etsu Chemical Co., Ltd.) as a leveling agent were added and the mixture was mixed to produce an antifoggant composition. The content of water (E) in Table 5 indicates the total of ion-exchanged water and water derived from the water-dispersible silica sol, and the content of the organic solvent indicates the total of organic solvents derived from components of the copolymer (A-1) solution and the like. The specific gravities of the blocked polyisocyanate curing agent (B) and the like and further, the obtained antifoggant composition were measured with a hydrometer pycnometer in accordance with JIS B 7523-3, and as a result, found to be 1.04. The amount of the organic solvent contained in 1 kg of this antifoggant composition was 78.8 g, and thus the VOC amount was calculated to be 78.8×1.04=82 g/L. The NCO/OH ratio was calculated as follows. {(B-1) NCO mol×(B-1) parts by mass (in terms of active ingredient)}/{(A-1) OH mol×(A-1) parts by mass (in terms of active ingredient)}={0.048×110}/{(0.070× 100}=0.75

The results obtained by the following evaluation method using the antifoggant composition obtained above are shown in Table 5.

<Evaluation of Solvent Cracking Resistance>

Under an environment set at 25° C., a polycarbonate resin plate having a thickness of 3 mm was bent by applying a stress of 120 N to 150 N by an autograph, and the antifoggant composition obtained above was applied so that the wet film thickness was about 3 μm. After the application, the plate was left to stand in the same environment for 2 minutes. The test specimen produced by the above method was visually observed and evaluated according to the following 4 point scale. When the evaluation is B− or more, there is no problem in practical use, B+ is preferable, and A is more preferable.

A: No crack is observed in the base material when a stress of 150 N is applied.

B+: No crack is observed in the base material when a stress of 140 N is applied.

B−: No crack is observed in the base material when a stress of 130 N is applied.

C: Cracks are observed in the base material when a stress of 120 N is applied.

<Production of Anti-Fog Article>

The antifoggant composition obtained above was applied to a polycarbonate (PC) resin plate having a thickness of 3 mm by a spray coating method so that the film thickness of the antifogging film after curing was about 5 μm, and heat-cured at 130° C. for 20 minutes to produce an anti-fog article (test specimen) having an antifogging film.

The results obtained by the following evaluation method using the test specimen obtained above are shown in Table 5.

<Evaluation of Transparency>

According to Plastics—Determination of the total luminous transmittance of transparent materials (JIS-K 7361-1), the HAZE value of the test specimen was measured (light source: white LED, light flux: 14 mm, temperature: 25° C., humidity: 50%) using a haze meter ("HAZE METER HDN 5000", manufactured by NIPPON DENSHOKU INDUSTRIES Co., Ltd.), and evaluated according to the following 4 point scale. When the evaluation is B− or more, there is no problem in practical use, B+ is preferable, and A is more preferable. The HAZE value of the PC resin plate having a thickness of 3 mm was 0.30.

A: 0.30 or more and less than 0.40
B+: 0.40 or more and less than 0.50
B−: 0.50 or more and less than 0.60
C: 0.60 or more <Evaluation of Antifogging Properties>
<Steam Test>

The test specimen was placed at a height of 5 cm from the water surface of a warm water bath maintained at 80° C. so that the antifogging film surface faced downward, the antifogging film was continuously irradiated with steam from the warm water bath, and the presence or absence of fogging after 10 seconds from the irradiation was visually evaluated according to the following 4 point scale. When the evaluation is B− or more, there is no problem in practical use, B+ is preferable, and A is more preferable.

A: A water film is formed immediately after steam irradiation and fogging does not occur.
B+: Though brief fogging is observed immediately after steam irradiation, a water film is immediately formed and fogging disappears.
B−: Though fogging is observed immediately after steam irradiation, a water film is eventually formed and fogging disappears.
C: Fogging is observed immediately after steam irradiation, and no water film is formed.

<Steam Test after Moisture Resistance Test>

The test specimen was allowed to stand at 50° C. and 95% RH for 240 hours, and then allowed to stand at room temperature for 1 hour. Then, the test specimen was placed at a height of 5 cm from the water surface of a warm water bath maintained at 80° C. so that the antifogging film surface faced downward, the antifogging film was continuously irradiated with steam from the warm water bath, and the presence or absence of fogging after 10 seconds from the irradiation was visually evaluated according to the following 4 point scale. When the evaluation is B− or more, there is no problem in practical use, B+ is preferable, and A is more preferable.

A: A water film is formed immediately after steam irradiation and fogging does not occur.
B+: Though brief fogging is observed immediately after steam irradiation, a water film is immediately formed and fogging disappears.
B−: Though fogging is observed immediately after steam irradiation, a water film is eventually formed and fogging disappears.
C: No clean water film is formed or no water film is formed after steam irradiation, and fogging is observed.

<Steam Test after Heat Resistance Test>

The test specimen was allowed to stand at 120° C. for 240 hours, and then allowed to stand at room temperature for 1 hour. Then, the test specimen was placed at a height of 5 cm from the water surface of a warm water bath maintained at 80° C. so that the antifogging film surface faced downward, the antifogging film was continuously irradiated with steam from the warm water bath, and the presence or absence of fogging after 10 seconds from the irradiation was visually evaluated according to the following 4 point scale. When the evaluation is B− or more, there is no problem in practical use, B+ is preferable, and A is more preferable.

A: A water film is formed immediately after steam irradiation and fogging does not occur.
B+: Though brief fogging is observed immediately after steam irradiation, a water film is immediately formed and fogging disappears.
B−: Though fogging is observed immediately after steam irradiation, a water film is eventually formed and fogging disappears.
C: No clean water film is formed or no water film is formed after steam irradiation, and fogging is observed.

<Evaluation of Adhesion>

A region of 1 cm in length and 1 cm in width of the antifogging film of the test specimen was cut at intervals of 1 mm in length and width using a cutter knife to form 100 squares. Cellophane tape was pressure-bonded to the surface of the squares, the appearance when the tape was rapidly peeled off was visually observed, and evaluation was performed according to the following 3 point scale. When the evaluation is B or more, there is no problem in practical use, and A is more preferable.

A: Peeling-off was not observed at all.
B: Slight peeling-off is observed at the intersection of the squares.
C: Partially peeled off or completely peeled off.

<Evaluation of Water Resistance>

The test specimen was allowed to stand in warm water at 40° C. for 240 hours and then allowed to stand at room temperature for 1 hour, and then the appearance of the antifogging film was visually evaluated according to the following 3 point scale. When the evaluation is B or more, there is no problem in practical use, and A is more preferable.

A: There is no change in appearance from before the test.
B: The antifogging film surface is slightly rough.
C: The antifogging film surface is rough, or slight whitening or stain is observed.

Examples 2 to 31 and Comparative Examples 1 to 9

<Production of Antifoggant Composition and Production of Anti-Fog Article>

The antifoggant compositions of Examples 2 to 31 and Comparative Examples 1 to 9 were produced by the same operations as in Example 1 except that the raw materials of Example 1 were changed to the raw materials and the compounding amounts thereof shown in Tables 5 to 8. Further, anti-fog articles (test specimens) comprising antifogging films of Examples 2 to 31 and Comparative Examples 1 to 9 were produced by the same operations as in Example 1. The content of water (E) in Tables 5 to 8 indicates the total of ion-exchanged water and water derived from water-dispersible silica sol. The results obtained by the above evaluation method using the obtained antifoggant compositions and test specimens are shown in Tables 5 to 8.

TABLE 5

| | | | Examples | | | | | |
|---|---|---|---|---|---|---|---|---|
| | | | 1 | 2 | 3 | 4 | 5 | 6 |
| Antifoggant composition | Copolymer (A) | | A-1 | A-2 | A-3 | A-4 | A-5 | A-6 |
| | Blocked polyisocyanate curing agent (B) (Solid content) [parts by mass] | B-1 | 110 | | | | | |
| | | B-2 | | | | 70 | | |
| | | B-3 | | 100 | | | | |
| | | B-4 | | | 100 | | | |
| | | B-5 | | | | | 100 | |

TABLE 5-continued

| | | | | | | | | |
|---|---|---|---|---|---|---|---|---|
| | B-6 | | | | | | | |
| | B-7 | | | | | | | 140 |
| | B-8 | | | | | | | |
| | B-9 | | | | | | | |
| | Aqua BI200 | | | | | | | |
| | Aqua BI220 | | | | | | | |
| | WM44-L20G | | | | | | | |
| NCO/OH | | | 0.750 | 1.127 | 0.940 | 1.108 | 1.126 | 0.848 |
| Colloidal | ST-OS | | | | | | | |
| silica (C) | ST-NS | | | | | | | |
| (Solid content) | ST-O | | | | | | 200 | |
| [parts by mass] | ST-N | | | 250 | | 180 | | |
| | ST-N-40 | | | | 240 | | | 200 |
| | ST-O-40 | | 200 | | | | | |
| | ST-OL | | | | | | | |
| | ST-MP-1040 | | | | | | | |
| Surfactant (D) | Anionic | RAPISOL A-80 | 20 | | | 18 | | 20 |
| [parts by mass] | | FT-100 | | 10 | 10 | | | |
| | | FT-150 | | | | | 10 | |
| | Cationic | TBAB | | 2 | | 2 | | |
| | | 2-DB-500E | | | 2 | | | 2 |
| | Nonionic | ID-209 | | | | | | |
| | | L-4 | | | | | | |
| | Amphoteric | BL-SF | | | | | 2 | |
| | | BDL-SF | | | | | | |
| Water (E) [parts by mass] | | | 3253 | 3236 | 3246 | 3373 | 3286 | 3176 |
| Organic solvent | 3-Methoxy-3-methylbutanol | | 315 | 300 | 300 | 255 | 300 | 360 |
| [parts by mass] | N-Methylpyrrolidone | | 0 | 0 | 0 | 0 | 0 | 0 |
| | COASOL | | 0 | 0 | 0 | 0 | 0 | 0 |
| | Dipropylene glycol dimethyl ether | | 0 | 0 | 0 | 0 | 0 | 0 |
| Solvent/water [mass ratio] | | | 0.10 | 0.09 | 0.09 | 0.08 | 0.09 | 0.11 |
| VOC amount [g/L] | | | 82 | 78 | 78 | 66 | 78 | 94 |
| Catalyst [parts by mass] | Potassium oleate | | 1 | 1 | 1 | 1 | 1 | 1 |
| Leveling agent [parts by mass] | KF-351A | | 1 | 1 | 1 | 1 | 1 | 1 |
| Evaluation results | Transparency | | A | A | A | A | A | A |
| | Antifogging properties | Steam test | B+ | A | B+ | A | B+ | A |
| | | Steam test after moisture resistance test | B+ | A | B+ | A | B− | A |
| | | Steam test after heat resistance test | B+ | A | B+ | A | B− | A |
| | Adhesion | | A | A | A | A | A | A |
| | Water resistance | | A | A | A | B | A | B |
| | Solvent cracking resistance | | A | A | A | A | A | A |

| | | | | Examples | | | |
|---|---|---|---|---|---|---|---|
| | | | | 7 | 8 | 9 | 10 |
| Antifoggant composition | Copolymer (A) | | | A-7 | A-8 | A-9 | A-10 |
| | Blocked polyisocyanate curing agent (B) (Solid content) [parts by mass] | B-1 | | | 120 | | |
| | | B-2 | | | | | |
| | | B-3 | | | | | |
| | | B-4 | | | | | |
| | | B-5 | | | | | |
| | | B-6 | | | | | |
| | | B-7 | | | | 70 | 80 |
| | | B-8 | | | | | |
| | | B-9 | | 100 | | | |
| | | Aqua BI200 | | | | | |
| | | Aqua BI220 | | | | | |
| | | WM44-L20G | | | | | |
| | NCO/OH | | | 0.714 | 1.144 | 1.352 | 1.455 |
| | Colloidal silica (C) (Solid content) [parts by mass] | ST-OS | | | | | |
| | | ST-NS | | | | | |
| | | ST-O | | | | 220 | |
| | | ST-N | | 240 | | | |
| | | ST-N-40 | | | | | |
| | | ST-O-40 | | | 200 | | 200 |
| | | ST-OL | | | | | |
| | | ST-MP-1040 | | | | | |

TABLE 5-continued

| | | | | | | | |
|---|---|---|---|---|---|---|---|
| | Surfactant (D) [parts by mass] | Anionic | RAPISOL A-80 | | 20 | | |
| | | | FT-100 | | | 9 | 8 |
| | | | FT-150 | 10 | | | |
| | | Cationic | TBAB | | | | |
| | | | 2-DB-500E | | | | |
| | | Nonionic | ID-209 | 2 | | | |
| | | | L-4 | | | | 3 |
| | | Amphoteric | BL-SF | | | 3 | |
| | | | BDL-SF | | 3 | | |
| | Water (E) [parts by mass] | | | 3246 | 3225 | 3341 | 3337 |
| | Organic solvent [parts by mass] | 3-Methoxy-3-methylbutanol | | 300 | 330 | 255 | 270 |
| | | N-Methylpyrrolidone | | 0 | 0 | 0 | 0 |
| | | COASOL | | 0 | 0 | 0 | 0 |
| | | Dipropylene glycol dimethyl ether | | 0 | 0 | 0 | 0 |
| | Solvent/water [mass ratio] | | | 0.09 | 0.10 | 0.08 | 0.08 |
| | VOC amount [g/L] | | | 78 | 86 | 66 | 70 |
| | Catalyst [parts by mass] | Potassium oleate | | 1 | 1 | 1 | 1 |
| | Leveling agent [parts by mass] | KF-351A | | 1 | 1 | 1 | 1 |
| | Evaluation results | Transparency | | B+ | A | A | B− |
| | | Antifogging properties | Steam test | A | B+ | B+ | A |
| | | | Steam test after moisture resistance test | A | B− | B+ | A |
| | | | Steam test after heat resistance test | A | B− | B− | A |
| | | Adhesion | | A | A | A | A |
| | | Water resistance | | B | B | A | A |
| | | Solvent cracking resistance | | A | A | A | A |

TABLE 6

| | | | Examples | | | | | |
|---|---|---|---|---|---|---|---|---|
| | | | 11 | 12 | 13 | 14 | 15 | 16 |
| Antifoggant composition | Copolymer (A) | | A-11 | A-12 | A-13 | A-14 | A-15 | A-16 |
| | Blocked polyisocyanate curing agent (B) (Solid content) [parts by mass] | B-1 | | | | 100 | 80 | |
| | | B-2 | 120 | | | | | 100 |
| | | B-3 | | | | | | |
| | | B-4 | | | | | | |
| | | B-5 | | | | | | |
| | | B-6 | | | | | | |
| | | B-7 | | | | 100 | | |
| | | B-8 | | 120 | | | | |
| | | B-9 | | | | | | |
| | | Aqua BI200 | | | | | | |
| | | Aqua BI220 | | | | | | |
| | | WM44-L20G | | | | | | |
| | NCO/OH | | 1.078 | 1.212 | 1.502 | 1.697 | 1.369 | 0.794 |
| | Colloidal silica (C) (Solid content) [parts by mass] | ST-OS | | | | | | |
| | | ST-NS | | | | | | |
| | | ST-O | 220 | | | | 280 | |
| | | ST-N | | 150 | 200 | | | |
| | | ST-N-40 | | | | 150 | | |
| | | ST-O-40 | | | | | | 150 |
| | | ST-OL | | | | | | |
| | | ST-MP-1040 | | | | | | |
| | Surfactant (D) [parts by mass] | Anionic | RAPISOL A-80 | 22 | | 19 | 19 | | |
| | | | FT-100 | | 10 | | | 10 | |
| | | | FT-150 | | | | | | 8 |
| | | Cationic | TBAB | | | | 2 | | 3 |
| | | | 2-DB-500E | | 2 | | | | |
| | | Nonionic | ID-209 | 2 | | | | | |
| | | | L-4 | | | | | | |
| | | Amphoteric | BL-SF | | | | 2 | | |
| | | | BDL-SF | | | | | 2 | |
| | Water (E) [parts by mass] | | 3204 | 3286 | 3277 | 3327 | 3256 | 3337 |
| | Organic solvent [parts by mass] | 3-Methoxy-3-methylbutanol | 330 | 330 | 300 | 300 | 270 | 300 |
| | | N-Methylpyrrolidone | 0 | 0 | 0 | 0 | 0 | 0 |
| | | COASOL | 0 | 0 | 0 | 0 | 0 | 0 |
| | | Dipropylene glycol dimethyl ether | 0 | 0 | 0 | 0 | 0 | 0 |

TABLE 6-continued

| | | | | | | | | |
|---|---|---|---|---|---|---|---|---|
| Solvent/water [mass ratio] | | | 0.10 | 0.10 | 0.09 | 0.09 | 0.08 | 0.09 |
| VOC amount [g/L] | | | 86 | 86 | 78 | 78 | 70 | 78 |
| Catalyst [parts by mass] | Potassium oleate | | 1 | 1 | 1 | 1 | 1 | 1 |
| Leveling agent [parts by mass] | KF-351A | | 1 | 1 | 1 | 1 | 1 | 1 |
| Evaluation results | Transparency | | A | A | A | A | B+ | A |
| | Antifogging properties | Steam test | B+ | B+ | B+ | B− | A | A |
| | | Steam test after moisture resistance test | B+ | B− | B+ | B− | A | A |
| | | Steam test after heat resistance test | B+ | B− | B+ | B− | A | A |
| | Adhesion | | A | B | A | B | A | A |
| | Water resistance | | A | A | A | A | A | A |
| | Solvent cracking resistance | | A | A | A | A | A | A |

| | | | | Examples | | |
|---|---|---|---|---|---|---|
| | | | | 17 | 18 | 19 |
| Antifoggant composition | Copolymer (A) | | | A-17 | A-1 | A-17 |
| | Blocked polyisocyanate curing agent (B) (Solid content) [parts by mass] | B-1 | | | | |
| | | B-2 | | | 45 | |
| | | B-3 | | | | |
| | | B-4 | | | | |
| | | B-5 | | | | |
| | | B-6 | | | | |
| | | B-7 | | | 275 | |
| | | B-8 | | | | |
| | | B-9 | | | | |
| | | Aqua BI200 | | | | 80 |
| | | Aqua BI220 | | | | |
| | | WM44-L20G | | | | |
| | NCO/OH | | | 0.268 | 1.627 | 0.423 |
| | Colloidal silica (C) (Solid content) [parts by mass] | ST-OS | | | | |
| | | ST-NS | | | | |
| | | ST-O | | | 200 | |
| | | ST-N | | | | 150 |
| | | ST-N-40 | | 250 | | |
| | | ST-O-40 | | | | |
| | | ST-OL | | | | |
| | | ST-MP-1040 | | | | |
| | Surfactant (D) [parts by mass] | Anionic | RAPISOL A-80 | 17 | 20 | |
| | | | FT-100 | | | |
| | | | FT-150 | | | 10 |
| | | Cationic | TBAB | 3 | 2 | |
| | | | 2-DB-500E | | | |
| | | Nonionic | ID-209 | | | 3 |
| | | | L-4 | | | |
| | | Amphoteric | BL-SF | | | |
| | | | BDL-SF | | | |
| | Water (E) [parts by mass] | | | 3366 | 2839 | 3385 |
| | Organic solvent [parts by mass] | 3-Methoxy-3-methylbutanol | | 218 | 563 | 150 |
| | | N-Methylpyrrolidone | | 0 | 0 | 120 |
| | | COASOL | | 0 | 0 | 0 |
| | | Dipropylene glycol dimethyl ether | | 0 | 0 | 0 |
| | Solvent/water [mass ratio] | | | 0.06 | 0.18 | 0.08 |
| | VOC amount [g/L] | | | 57 | 146 | 70 |
| Catalyst [parts by mass] | Potassium oleate | | | 1 | 1 | 1 |
| Leveling agent [parts by mass] | KF-351A | | | 1 | 1 | 1 |
| Evaluation results | Transparency | | | A | A | B− |
| | Antifogging properties | Steam test | | A | A | A |
| | | Steam test after moisture resistance test | | A | A | A |
| | | Steam test after heat resistance test | | A | A | A |
| | Adhesion | | | B | B | B |
| | Water resistance | | | B | A | A |
| | Solvent cracking resistance | | | A | A | A |

TABLE 7

|  |  |  |  | Examples | | | | | | |
|---|---|---|---|---|---|---|---|---|---|---|
|  |  |  |  | 20 | 21 | 22 | 23 | 24 | 25 | 26 |
| Antifoggant composition | Copolymer (A) |  |  | A-16 | A-17 | A-1 | A-1 | A-1 | A-2 | A-16 |
|  | Blocked polyisocyanate curing agent (B) (Solid content) [parts by mass] | B-1 |  |  |  | 120 |  |  |  |  |
|  |  | B-2 |  |  |  |  | 80 |  | 80 |  |
|  |  | B-3 |  |  |  |  |  |  |  | 100 |
|  |  | B-4 |  |  |  |  |  |  |  |  |
|  |  | B-5 |  |  |  |  |  |  |  |  |
|  |  | B-6 |  |  |  |  |  |  |  |  |
|  |  | B-7 |  |  |  |  |  | 100 |  |  |
|  |  | B-8 |  |  |  |  |  |  |  |  |
|  |  | B-9 |  |  |  |  |  |  |  |  |
|  |  | Aqua BI200 |  |  |  |  |  |  |  |  |
|  |  | Aqua BI220 |  | 70 |  |  |  |  |  |  |
|  |  | WM44-L20G |  |  | 120 |  |  |  |  |  |
|  | NCO/OH |  |  | 0.794 | 0.268 | 0.818 | 1.150 | 0.575 | 1.073 | 0.794 |
|  | Colloidal silica (C) (Solid content) [parts by mass] | ST-OS |  |  |  |  |  |  |  | 200 |
|  |  | ST-NS |  |  |  |  |  |  |  |  |
|  |  | ST-O |  |  |  |  |  |  |  |  |
|  |  | ST-N |  |  |  | 160 | 310 |  |  |
|  |  | ST-N-40 |  |  |  |  |  | 500 | 90 |  |
|  |  | ST-O-40 |  | 150 | 180 |  |  |  |  |  |
|  |  | ST-OL |  |  |  |  |  |  |  |  |
|  |  | ST-MP-1040 |  |  |  |  |  |  |  |  |
|  | Surfactant (D) [parts by mass] | Anionic | RAPISOL A-80 | 16 |  | 25 | 20 |  |  |  |
|  |  |  | FT-100 |  | 9 |  |  | 8 |  | 11 |
|  |  |  | FT-150 |  |  |  |  |  | 11 |  |
|  |  | Cationic | TBAB | 4 |  | 7 |  | 3 |  |  |
|  |  |  | 2-DB-500E |  | 3 |  |  |  |  |  |
|  |  | Nonionic | ID-209 |  |  |  | 3 |  |  |  |
|  |  |  | L-4 |  |  |  |  |  |  | 2 |
|  |  | Amphoteric | BL-SF |  |  |  |  |  |  |  |
|  |  |  | BDL-SF |  |  |  |  |  | 2 |  |
|  | Water (E) [parts by mass] |  |  | 3403 | 3385 | 3256 | 3215 | 2987 | 3445 | 3285 |
|  | Organic solvent [parts by mass] | 3-Methoxy-3-methylbutanol |  | 150 | 150 | 330 | 270 | 300 | 270 | 300 |
|  |  | N-Methylpyrrolidone |  | 0 | 0 | 0 | 0 | 0 | 0 | 0 |
|  |  | COASOL |  | 105 | 0 | 0 | 0 | 0 | 0 | 0 |
|  |  | Dipropylene glycol dimethyl ether |  | 0 | 51 | 0 | 0 | 0 | 0 | 0 |
|  | Solvent/water [mass ratio] |  |  | 0.07 | 0.06 | 0.10 | 0.08 | 0.10 | 0.08 | 0.09 |
|  | VOC amount [g/L] |  |  | 66 | 52 | 86 | 70 | 78 | 70 | 78 |
|  | Catalyst [parts by mass] | Potassium oleate |  | 1 | 1 | 1 | 1 | 1 | 1 | 1 |
|  | Leveling agent [parts by mass] | KF-351A |  | 1 | 1 | 1 | 1 | 1 | 1 | 1 |
| Evaluation results | Transparency |  |  | B− | B− | B+ | B+ | B− | A | A |
|  | Antifogging properties | Steam test |  | A | A | A | A | A | A | A |
|  |  | Steam test after moisture resistance test |  | A | A | A | A | A | A | A |
|  |  | Steam test after heat resistance test |  | A | A | A | A | A | A | A |
|  | Adhesion |  |  | A | B | A | B | B | A | B |
|  | Water resistance |  |  | A | A | A | A | A | B | A |
|  | Solvent cracking resistance |  |  | A | A | A | A | A | A | A |

|  |  |  |  | Examples | | | | |
|---|---|---|---|---|---|---|---|---|
|  |  |  |  | 27 | 28 | 29 | 30 | 31 |
| Antifoggant composition | Copolymer (A) |  |  | A-16 | A-1 | A-2 | A-1 | A-1 |
|  | Blocked polyisocyanate curing agent (B) (Solid content) [parts by mass] | B-1 |  |  | 120 |  |  |  |
|  |  | B-2 |  | 90 |  |  | 40 |  |
|  |  | B-3 |  |  |  |  |  |  |
|  |  | B-4 |  |  |  |  |  |  |
|  |  | B-5 |  |  |  |  |  | 35 |
|  |  | B-6 |  |  |  |  |  |  |
|  |  | B-7 |  |  |  |  | 190 |  |
|  |  | B-8 |  |  |  |  |  |  |
|  |  | B-9 |  |  |  |  |  |  |
|  |  | Aqua BI200 |  |  |  |  |  |  |
|  |  | Aqua BI220 |  |  |  |  |  |  |
|  |  | WM44-L20G |  |  |  |  |  |  |
|  | NCO/OH |  |  | 0.794 | 0.818 | 1.019 | 0.575 | 0.769 |
|  | Colloidal silica (C) | ST-OS |  |  |  |  |  |  |
|  |  | ST-NS |  | 200 |  |  |  |  |

TABLE 7-continued

| | | | | | | | | |
|---|---|---|---|---|---|---|---|---|
| (Solid content) [parts by mass] | | ST-O | | | | | 200 | 200 |
| | | ST-N | | | | | | |
| | | ST-N-40 | | | | | | |
| | | ST-O-40 | | | | | | |
| | | ST-OL | | | 200 | | | |
| | | ST-MP-1040 | | | | 200 | | |
| Surfactant (D) [parts by mass] | Anionic | RAPISOL A-80 | | | | | | |
| | | FT-100 | | 10 | | 11 | 10 | |
| | | FT-150 | 10 | | 12 | | | |
| | Cationic | TBAB | 2 | | | | | |
| | | 2-DB-500E | | 2 | | 2 | | |
| | Nonionic | ID-209 | | | 2 | | 3 | |
| | | L-4 | | | | | | |
| | Amphoteric | BL-SF | | | | | | |
| | | BDL-SF | | | | | | |
| Water (E) [parts by mass] | | | 3311 | 3236 | 3059 | 850 | 650 | |
| Organic solvent [parts by mass] | 3-Methoxy-3-methylbutanol | | 285 | 330 | 435 | 210 | 203 | |
| | N-Methylpyrrolidone | | 0 | 0 | 0 | 0 | 0 | |
| | COASOL | | 0 | 0 | 0 | 0 | 0 | |
| | Dipropylene glycol dimethyl ether | | 0 | 0 | 0 | 0 | 0 | |
| Solvent/water [mass ratio] | | | 0.09 | 0.10 | 0.14 | 0.25 | 0.31 | |
| VOC amount [g/L] | | | 74 | 86 | 113 | 154 | 175 | |
| Catalyst [parts by mass] | Potassium oleate | | 1 | 1 | 1 | 1 | 1 | |
| Leveling agent [parts by mass] | KF-351A | | 1 | 1 | 1 | 1 | 1 | |
| Evaluation results | Transparency | | A | B+ | B− | A | A | |
| | Antifogging properties | Steam test | A | A | A | A | A | |
| | | Steam test after moisture resistance test | A | A | A | A | A | |
| | | Steam test after heat resistance test | A | A | A | A | A | |
| | Adhesion | | B | A | A | A | A | |
| | Water resistance | | A | A | A | B | B | |
| | Solvent cracking resistance | | A | A | A | B+ | B− | |

TABLE 8

| | | | Comparative Examples | | | | |
|---|---|---|---|---|---|---|---|
| | | | 1 | 2 | 3 | 4 | 5 |
| Antifoggant composition | Copolymer (A) | | A-18 | A-19 | A-20 | A-21 | A-1 |
| | Blocked polyisocyanate curing agent (B) (Solid content) [parts by mass] | B-1 | | | 100 | | |
| | | B-2 | | | | | |
| | | B-3 | 110 | | | | |
| | | B-4 | | | | | |
| | | B-5 | | 100 | | | |
| | | B-6 | | | | | |
| | | B-7 | | | | 120 | |
| | | B-8 | | | | | |
| | | B-9 | | | | | |
| | | Aqua BI200 | | | | | |
| | | Aqua BI220 | | | | | |
| | | WM44-L20G | | | | | |
| | NCO/OH | | 0.738 | — | 0.368 | 0.288 | 0.000 |
| | Colloidal silica (C) (Solid content) [parts by mass] | ST-OS | | | | | |
| | | ST-NS | | | | | |
| | | ST-O | | | | 200 | |
| | | ST-N | 120 | | 180 | | 180 |
| | | ST-N-40 | | | | | |
| | | ST-O-40 | | 150 | | | |
| | | ST-OL | | | | | |
| | | ST-MP-1040 | | | | | |
| | Surfactant (D) [parts by mass] | Anionic | RAPISOL A-80 | | 18 | 20 | | |
| | | FT-100 | | | | 9 | 9 |
| | | FT-150 | 8 | | | | |
| | Cationic | TBAB | 2 | | 2 | | |
| | | 2-DB-500E | | | | | |

TABLE 8-continued

|  |  |  |  |  |  |  |  |
|---|---|---|---|---|---|---|---|
|  | Nonionic | ID-209 |  | 1 |  | 1 |  |
|  |  | L-4 |  |  | 1 |  |  |
|  | Amphoteric | BL-SF |  |  |  |  |  |
|  |  | BDL-SF |  |  |  |  |  |
| Water (E) [parts by mass] |  |  | 3343 | 3329 | 3296 | 3238 | 3558 |
| Organic solvent [parts by mass] | 3-Methoxy-3-methylbutanol |  | 315 | 300 | 300 | 330 | 150 |
|  | N-Methylpyrrolidone |  | 0 | 0 | 0 | 0 | 0 |
|  | COASOL |  | 0 | 0 | 0 | 0 | 0 |
|  | Dipropylene glycol dimethyl ether |  | 0 | 0 | 0 | 0 | 0 |
| Solvent/water [mass ratio] |  |  | 0.09 | 0.09 | 0.09 | 0.10 | 0.04 |
| VOC amount [g/L] |  |  | 82 | 78 | 78 | 86 | 39 |
| Catalyst [parts by mass] | Potassium oleate |  | 1 | 1 | 1 | 1 | 1 |
| Leveling agent [parts by mass] | KF-351A |  | 1 | 1 | 1 | 1 | 1 |
| Evaluation results | Transparency |  | A | C | C | A | A |
|  | Antifogging properties | Steam test | C | A | A | A | A |
|  |  | Steam test after moisture resistance test | C | A | A | A | A |
|  |  | Steam test after heat resistance test | C | A | A | A | A |
|  | Adhesion |  | A | A | A | A | A |
|  | Water resistance |  | A | C | A | C | C |
|  | Solvent cracking resistance |  | A | A | A | A | A |

|  |  |  |  | Comparative Examples |  |  |  |
|---|---|---|---|---|---|---|---|
|  |  |  |  | 6 | 7 | 8 | 9 |
| Antifoggant composition | Copolymer (A) |  |  | A-17 | A-16 | A-2 | A-2 |
|  | Blocked polyisocyanate curing agent (B) (Solid content) [parts by mass] | B-1 |  |  |  |  |  |
|  |  | B-2 |  |  | 100 |  |  |
|  |  | B-3 |  |  |  |  | 70 |
|  |  | B-4 |  |  |  |  |  |
|  |  | B-5 |  |  |  |  |  |
|  |  | B-6 |  |  |  |  |  |
|  |  | B-7 |  | 350 |  | 150 |  |
|  |  | B-8 |  |  |  |  |  |
|  |  | B-9 |  |  |  |  |  |
|  |  | Aqua BI200 |  |  |  |  |  |
|  |  | Aqua BI220 |  |  |  |  |  |
|  |  | WM44-L20G |  |  |  |  |  |
|  | NCO/OH |  |  | 0.268 | 0.794 | 0.805 | 0.789 |
|  | Colloidal silica (C) (Solid content) [parts by mass] | ST-OS |  |  |  |  |  |
|  |  | ST-NS |  |  |  |  |  |
|  |  | ST-O |  |  | 700 |  |  |
|  |  | ST-N |  |  |  |  | 200 |
|  |  | ST-N-40 |  |  |  |  |  |
|  |  | ST-O-40 |  | 180 |  |  |  |
|  |  | ST-OL |  |  |  |  |  |
|  |  | ST-MP-1040 |  |  |  |  |  |
|  | Surfactant (D) [parts by mass] | Anionic | RAPISOL A-80 |  | 16 | 17 |  |
|  |  |  | FT-100 |  |  |  |  |
|  |  |  | FT-150 | 8 |  |  | 9 |
|  |  | Cationic | TBAB |  |  |  |  |
|  |  |  | 2-DB-500E | 3 | 3 |  |  |
|  |  | Nonionic | ID-209 |  |  | 3 | 2 |
|  |  |  | L-4 |  |  |  |  |
|  |  | Amphoteric | BL-SF |  |  |  |  |
|  |  |  | BDL-SF |  |  |  |  |
| Water (E) [parts by mass] |  |  |  | 2682 | 2779 | 3353 | 600 |
| Organic solvent [parts by mass] | 3-Methoxy-3-methylbutanol |  |  | 675 | 300 | 375 | 255 |
|  | N-Methylpyrrolidone |  |  | 0 | 0 | 0 | 0 |
|  | COASOL |  |  | 0 | 0 | 0 | 0 |
|  | Dipropylene glycol dimethyl ether |  |  | 0 | 0 | 0 | 0 |
| Solvent/water [mass ratio] |  |  |  | 0.25 | 0.11 | 0.11 | 0.43 |
| VOC amount [g/L] |  |  |  | 176 | 78 | 98 | 214 |
| Catalyst [parts by mass] | Potassium oleate |  |  | 1 | 1 | 1 | 1 |
| Leveling agent [parts by mass] | KF-351A |  |  | 1 | 1 | 1 | 1 |

TABLE 8-continued

| | | | | | | |
|---|---|---|---|---|---|---|
| | | Transparency | A | C | A | A |
| | | Antifogging Steam test | A | A | A | A |
| | | properties Steam test after moisture resistance test | A | A | A | A |
| Evaluation results | | Steam test after heat resistance test | A | A | A | A |
| | Adhesion | | C | B | A | A |
| | Water resistance | | A | A | C | A |
| | Solvent cracking resistance | | B− | A | A | C |

In Tables 5 to 8, for the blocked polyisocyanate curing agent (B),

"Aqua BI200" refers to an isocyanurate form of hexamethylene diisocyanate blocked with anionic dimethyl pyrazole (trade name: "Aqua BI200" manufactured by BAXENDEN, active ingredient: 40 mass %, NCO amount: 4.5 mass %, NCO mol amount in 100 g: 0.13);

"Aqua BI 220" refers to an isocyanurate form of hexamethylene diisocyanate blocked with nonionic dimethyl pyrazole (trade name: "Aqua BI200" manufactured by BAXENDEN, active ingredient: 40 mass %, NCO amount: 4.2 mass %, NCO mol amount in 100 g: 0.10); and "WM 44-L70G" refers to an isocyanurate form of hexamethylene diisocyanate blocked with malonic ester (trade name: "Duranate WM 44-L70G" manufactured by Asahi Kasei Corporation, active ingredient: 70 mass %, NCO amount: 5.3 mass %, NCO mol amount in 100 g: 0.13).

In Tables 5 to 8, for the colloidal silica (C),

ST-OS refers to a water-dispersible silica sol having an average particle diameter of 8 to 10 nm (trade name: "SNOWTEX OS", manufactured by Nissan Chemical Corporation, active ingredient: 20 mass %);

ST-O refers to a water-dispersible silica sol having an average particle diameter of 10 to 15 nm (trade name: "SNOWTEX O", manufactured by Nissan Chemical Corporation, active ingredient: 20 mass %);

ST-O-40 refers to a water-dispersible silica sol having an average particle diameter of 20 to 25 nm (trade name: "SNOWTEX O-40", manufactured by Nissan Chemical Corporation, active ingredient: 40 mass %);

ST-OL refers to a water-dispersible silica sol having an average particle diameter of 40 to 50 nm (trade name: "SNOWTEX OL", manufactured by Nissan Chemical Corporation, active ingredient: 20 mass %);

ST-MP-1040 refers to a water-dispersible silica sol having an average particle diameter of 70 to 130 nm (trade name: "SNOWTEX MP-1040", manufactured by Nissan Chemical Corporation, active ingredient: 40 mass %);

ST-NS refers to a water-dispersible silica sol having an average particle diameter of 8 to 10 nm (trade name: "SNOWTEX NS", manufactured by Nissan Chemical Corporation, active ingredient: 20 mass %);

ST-N refers to a water-dispersible silica sol having an average particle diameter of 10 to 15 nm (trade name: "SNOWTEX N", manufactured by Nissan Chemical Corporation, active ingredient: 20 mass %); and ST-N-40 refers to a water-dispersible silica sol having an average particle diameter of 20 to 25 nm (trade name: "SNOWTEX N-40", manufactured by Nissan Chemical Corporation, active ingredient: 40 mass %).

In Tables 5 to 8, for the surfactant (D),

Rapizole A-80 refers to a sulfosuccinic acid diester salt (trade name: "Rapizole A-80", manufactured by NOF CORPORATION, active ingredient: 80 mass %);

FT-100 refers to a fluorine-containing anionic surfactant (sulfonic acid Na salt) (trade name: "FTERGENT 100", manufactured by NEOS COMPANY LIMITED);

FT-150 refers to a fluorine-containing anionic surfactant (sulfonic acid Na salt+carboxylic acid Na salt) (trade name: "FTERGENT 150", manufactured by NEOS COMPANY LIMITED);

TBAB refers to tetra-n-butylammonium bromide;

2-DB-500E refers to didecyldimethylammonium chloride (trade name: "NISSAN CATION 2-DB-500E", manufactured by NOF CORPORATION, active ingredient: 50 mass %);

ID-209 refers to polyoxyethylene isodecyl ether (trade name: "Nonion ID-209", manufactured by NOF Corporation);

L-4 refers to polyoxyethylene monolaurate (trade name: "Nonion L-4", manufactured by NOF CORPORATION);

BL-SF refers to lauryldimethylaminoacetic acid betaine (trade name: "NISSAN ANON BL-SF", manufactured by NOF CORPORATION, active ingredient: 36 mass %); and BDL-SF refers to betaine laurate amidopropyl dimethylaminoacetate (trade name: "NISSAN ANON BDL-SF", manufactured by NOF CORPORATION, active ingredient: 30 mass %).

In Tables 5 to 8, for the organic solvent, COASOL refers to a mixture of diisobutyl glutarate, diisobutyl succinate, and diisobutyl adipate (trade name: COASOL, manufactured by DAW CHEMICAL).

For the leveling agent, KF351-A refers to polyether-modified polysiloxane (trade name: KF351-A, manufactured by Shin-Etsu Chemical Co., Ltd.).

The invention claimed is:

1. An antifoggant composition, comprising:

a copolymer (A);

a blocked polyisocyanate curing agent (B);

a colloidal silica (C);

a surfactant (D); and water (E), wherein the copolymer (A) is a (meth)acrylate copolymer obtained from a monomer mixture containing an N,N-dialkyl (meth)acrylamide monomer (a-1) represented by General Formula (1):

[Formula 1]

(1)

[structure: CH2=C(R1)-C(=O)-N(R2)(R3)]

(wherein $R^1$ is a hydrogen atom or a methyl group, and $R^2$ and $R^3$ are independently a linear or branched alkyl group having 1 to 8 carbon atoms);

an ε-caprolactone-added hydroxyalkyl (meth)acrylate monomer (a-2) represented by General Formula (2):

[Formula 2]

(2)

[structure: CH2=C(R4)-C(=O)-O-CH2CH2-O-[C(=O)-(CH2)5-O]n-H]

(wherein $R^4$ is a hydrogen atom or a methyl group, and n is an integer of 1 to 10); and a (meth)acrylate monomer (a-3) having a hydrocarbon group represented by General Formula (3):

[Formula 3]

(3)

[structure: CH2=C(R5)-C(=O)-O-R6]

(wherein $R^5$ is a hydrogen atom or a methyl group, and $R^6$ is a linear, branched, or cyclic hydrocarbon group having 1 to 22 carbon atoms), and an amount of the blocked polyisocyanate curing agent (B) is 35 to 300 parts by mass, an amount of the colloidal silica (C) is 80 parts by mass or more and 600 parts by mass or less, and an amount of the water (E) is 650 parts by mass or more relative to 100 parts by mass of the copolymer (A).

2. The antifoggant composition according to claim 1, wherein an amount of the monomer (a-1) is 20 to 90 parts by mass, an amount of the monomer (a-2) is 5 to 50 parts by mass, and an amount of the monomer (a-3) is 1 to 40 parts by mass in 100 parts by mass of a total of the monomer (a-1), the monomer (a-2), and the monomer (a-3).

3. The antifoggant composition according to claim 1, wherein an amount of the surfactant (D) is 1 to 35 parts by mass relative to 100 parts by mass of the copolymer (A).

4. The antifoggant composition according to claim 1, wherein the monomer mixture further contains a (meth)acrylate monomer (a-4) having a hydroxyl group represented by General Formula (4):

[Formula 4]

(4)

[structure: CH2=C(R7)-C(=O)-O-R8-OH]

(wherein $R^7$ is a hydrogen atom or a methyl group, and $R^8$ is a linear or branched alkylene group having 1 to 8 carbon atoms)

and/or a (meth)acrylamide monomer (a-5) having a hydroxyl group represented by General Formula (5):

[Formula 5]

(5)

[structure: CH2=C(R9)-C(=O)-NH-R10-OH]

(wherein $R^9$ is a hydrogen atom or a methyl group, and $R^{10}$ is a linear or branched alkylene group having 1 to 8 carbon atoms).

5. The antifoggant composition according to claim 4, wherein an amount of the monomer (a-4) and/or the monomer (a-5) is 30 parts by mass or less relative to 100 parts by mass of a total of the monomer (a-1), the monomer (a-2), and the monomer (a-3).

6. The antifoggant composition according to claim 1, wherein the blocked polyisocyanate curing agent (B) is a (meth)acrylate polymer and/or copolymer having a blocked isocyanate group.

7. The antifoggant composition according to claim 1, wherein the blocked polyisocyanate curing agent (B) is a (meth)acrylate copolymer obtained from a monomer mixture containing an N,N-dialkyl (meth)acrylamide monomer (b-1) represented by General Formula (6):

[Formula 6]

(6)

[structure: CH2=C(R11)-C(=O)-N(R12)(R13)]

(wherein $R^{11}$ is a hydrogen atom or a methyl group, and $R^{12}$ and $R^{13}$ are independently a linear or branched alkyl group having 1 to 8 carbon atoms);

a (meth)acrylate monomer (b-2) having a blocked isocyanate group represented by General Formula (7):

[Formula 7]

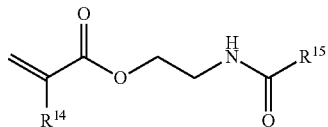

(7)

(wherein $R^{14}$ is a hydrogen atom or a methyl group, and $R^{15}$ is a residue derived from a blocking agent); and a (meth)acrylate monomer (b-3) having a hydrocarbon group represented by General Formula (8):

[Formula 8]

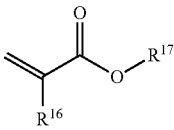

(8)

(wherein $R^{16}$ is a hydrogen atom or a methyl group, and $R^{17}$ is a linear, branched, or cyclic hydrocarbon group having 1 to 22 carbon atoms).

8. The antifoggant composition according to claim 7, wherein an amount of the monomer (b-1) is 20 to 90 parts by mass, an amount of the monomer (b-2) is 5 to 50 parts by mass, and an amount of the monomer (b-3) is 1 to 40 parts by mass in 100 parts by mass of a total of the monomer (b-1), the monomer (b-2), and the monomer (b-3).

9. An anti-fog article, comprising:
an antifogging film formed from the antifoggant composition according to claim 1 on a base material.

\* \* \* \* \*